(12) United States Patent
Kim et al.

(10) Patent No.: US 12,075,417 B2
(45) Date of Patent: Aug. 27, 2024

(54) METHOD FOR CONTROLLING PLURALITY OF ANTENNA REMOTE UNITS IN SIDELINK-SUPPORTING WIRELESS COMMUNICATION SYSTEM, AND DEVICE THEREFOR

(71) Applicant: LG ELECTRONICS INC., Seoul (KR)

(72) Inventors: Heejin Kim, Seoul (KR); Dongsun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 17/310,352

(22) PCT Filed: Mar. 11, 2020

(86) PCT No.: PCT/KR2020/003350
§ 371 (c)(1),
(2) Date: Jul. 28, 2021

(87) PCT Pub. No.: WO2020/184965
PCT Pub. Date: Sep. 17, 2020

(65) Prior Publication Data
US 2022/0150937 A1 May 12, 2022

Related U.S. Application Data

(60) Provisional application No. 62/817,577, filed on Mar. 13, 2019.

(30) Foreign Application Priority Data

Mar. 22, 2019 (KR) .................. 10-2019-0033113

(51) Int. Cl.
H04W 52/52 (2009.01)
H04L 25/02 (2006.01)
(Continued)

(52) U.S. Cl.
CPC .......... *H04W 72/21* (2023.01); *H04L 25/0204* (2013.01); *H04W 52/146* (2013.01); *H04W 52/52* (2013.01)

(58) Field of Classification Search
CPC ... H04W 72/21; H04W 52/146; H04W 52/52; H04W 4/40; H04W 56/00;
(Continued)

(56) References Cited

U.S. PATENT DOCUMENTS 6,711,221 B1 * 3/2004 Belotserkovsky .. H04L 27/2675
375/363
9,294,179 B2 * 3/2016 Frank ................... H04B 7/0639
(Continued)

FOREIGN PATENT DOCUMENTS

CA 3132546 A1 * 8/2014 .............. H03M 7/30
CN 110602775 A * 12/2019
(Continued)

OTHER PUBLICATIONS

PCT International Application No. PCT/KR2020/003350, International Search Report dated Jul. 1, 2020, 4 pages.

Primary Examiner — Yuwen Pan
Assistant Examiner — Swati Jain
(74) Attorney, Agent, or Firm — LEE, HONG, DEGERMAN, KANG & WAIMEY

(57) ABSTRACT

Disclosed herein are a method of controlling a plurality of antenna remote units by a user equipment (UE) in a wireless communication system supporting sidelink, and an apparatus therefor. Disclosed herein are a method controlling a plurality of antenna remote units by a user equipment (UE) in a wireless communication system supporting sidelink including determining a first time interval based on channel state estimation capability or decoding capability, transmitting a control signal to each of the plurality of antenna
(Continued)

remote units based on the first time interval, and performing channel state estimation or signal decoding based on a plurality of signals respectively received by the plurality of antenna remote units, wherein the control signal comprises control information indicating fixing of voltage gain of each of the plurality of antenna remote units during the first time interval, and an apparatus therefor.

14 Claims, 23 Drawing Sheets

(51) Int. Cl.
*H04W 52/14* (2009.01)
*H04W 72/21* (2023.01)

(58) Field of Classification Search
CPC ............ H04L 25/0204; H04L 25/0224; H04B 7/0426; H04B 7/0617; H04B 1/3822; H04B 7/26
See application file for complete search history.

(56) References Cited

U.S. PATENT DOCUMENTS

| | | | |
|---|---|---|---|
| 10,299,228 B1* | 5/2019 | Wurtenberger | H04B 7/15535 |
| 10,502,826 B2* | 12/2019 | Tasovac | G01S 13/878 |
| 11,063,734 B2* | 7/2021 | Ovesjö | H04L 5/0048 |
| 2002/0080853 A1* | 6/2002 | Zeira | H04W 52/10 370/347 |
| 2007/0201587 A1* | 8/2007 | Sato | H04L 25/0228 375/345 |
| 2010/0098196 A1* | 4/2010 | Lee | H03G 3/3052 375/345 |
| 2011/0007832 A1* | 1/2011 | Yamada | H04B 7/0634 375/267 |
| 2012/0140723 A1* | 6/2012 | Taoka | H04L 1/0025 370/329 |
| 2014/0211891 A1* | 7/2014 | Park | H04B 1/16 375/345 |
| 2016/0142898 A1* | 5/2016 | Poitau | H04W 72/0446 370/329 |
| 2017/0373890 A1* | 12/2017 | Fertonani | H04L 9/40 |
| 2018/0014333 A1* | 1/2018 | Moon | H04L 5/0051 |
| 2018/0164429 A1* | 6/2018 | Tasovac | G01S 13/878 |
| 2018/0287647 A1* | 10/2018 | Morishita | H04B 1/16 |
| 2019/0110280 A1* | 4/2019 | Akkarakaran | H04L 5/0051 |
| 2020/0084811 A1* | 3/2020 | Uchiyama | H04W 72/53 |
| 2020/0145799 A1* | 5/2020 | Baghel | H04L 1/0018 |
| 2020/0163005 A1* | 5/2020 | Rao | H04W 4/46 |
| 2020/0169995 A1* | 5/2020 | Nam | H04W 72/21 |
| 2020/0252255 A1* | 8/2020 | Sorrentino | H04B 7/0456 |
| 2021/0160912 A1* | 5/2021 | Fakoorian | H04W 72/23 |
| 2021/0203455 A1* | 7/2021 | Zhang | H04W 56/001 |
| 2021/0219268 A1* | 7/2021 | Li | H04W 72/20 |
| 2021/0250945 A1* | 8/2021 | Chen | H04L 1/189 |
| 2021/0259034 A1* | 8/2021 | Damnjanovic | H04W 8/24 |
| 2021/0306824 A1* | 9/2021 | Li | H04W 4/40 |
| 2021/0320766 A1* | 10/2021 | Li | H04L 5/006 |
| 2021/0321348 A1* | 10/2021 | Ohara | H04W 72/30 |
| 2021/0321376 A1* | 10/2021 | Lu | H04W 72/23 |
| 2021/0352597 A1* | 11/2021 | Do | H04W 72/0446 |
| 2021/0385821 A1* | 12/2021 | Yeo | H04W 72/0446 |
| 2021/0410084 A1* | 12/2021 | Li | H04W 52/265 |
| 2022/0070972 A1* | 3/2022 | Belleschi | H04W 4/08 |
| 2022/0077983 A1* | 3/2022 | Ren | H04L 5/0048 |
| 2022/0086775 A1* | 3/2022 | Wang | H04W 56/0015 |
| 2022/0110141 A1* | 4/2022 | Kwak | H04W 76/28 |
| 2022/0140967 A1* | 5/2022 | Khoryaev | H04W 56/002 375/220 |
| 2022/0174720 A1* | 6/2022 | Yang | H04W 72/23 |
| 2022/0183002 A1* | 6/2022 | Yeo | H04L 1/1607 |
| 2022/0256373 A1* | 8/2022 | Ren | H04L 27/261 |
| 2022/0286179 A1* | 9/2022 | Hosseini | H04B 7/0658 |
| 2022/0330038 A1* | 10/2022 | Ganesan | H04W 52/10 |
| 2022/0417923 A1* | 12/2022 | Uchiyama | H04W 4/40 |
| 2023/0050470 A1* | 2/2023 | Chervyakov | H04L 25/0224 |
| 2023/0217445 A1* | 7/2023 | Zhao | H04W 72/20 370/330 |
| 2023/0262842 A1* | 8/2023 | Uchiyama | H04L 1/1825 370/329 |

FOREIGN PATENT DOCUMENTS

| | | | | |
|---|---|---|---|---|
| EP | 1826971 A1 * | 8/2007 | | H04L 25/0228 |
| EP | 3982697 A1 * | 4/2022 | | H03M 7/30 |
| JP | 2005244561 | 9/2005 | | |
| JP | 2005244561 A * | 9/2005 | | |
| KR | 10-20180009644 A * | 1/2018 | | H04B 17/364 |
| KR | 20180006211 | 1/2018 | | |
| KR | 20180009644 | 1/2018 | | |
| KR | 20180009644 A * | 1/2018 | | H04B 17/364 |
| WO | WO-0031867 A1 * | 6/2000 | | H03G 1/0023 |
| WO | WO-2020088636 A1 * | 5/2020 | | H04L 25/0224 |
| WO | WO-2022187606 A1 * | 9/2022 | | H04B 7/0626 |

* cited by examiner (a)

(b)

METHOD FOR CONTROLLING PLURALITY OF ANTENNA REMOTE UNITS IN SIDELINK-SUPPORTING WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/003350, filed on Mar. 11, 2020, which claims the benefit of U.S. Provisional Application No. 62/817,577, filed on Mar. 13, 2019, and also claims the benefit of earlier filing date and right of priority to Korean Application No. 10-2019-0033113, filed on Mar. 22, 2019, the contents of which are all hereby incorporated by reference herein in their entireties.

TECHNICAL FIELD

The present disclosure relates to a method of performing channel estimation or data decoding by controlling a plurality of antenna remote units by a user equipment (UE) in a wireless communication system supporting sidelink, and an apparatus therefor.

BACKGROUND ART

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a view illustrating comparison between V2X communication based on RAT before NR and V2X communication based on NR.

In relation to V2X communication, in RAT before NR, based on a V2X message such as a basic safety message (BSM), a cooperative awareness message (CAM) or a decentralized environmental notification message (DENM), a method of providing a safety service has been mainly discussed. The V2X message may include position information, dynamic information, attribute information, or the like. For example, a UE may transmit a periodic message type CAM and/or an event triggered message type DENM to another UE.

For example, the CAM may include basic vehicle information such as vehicle dynamic state information such as direction and speed, vehicle static data such as dimension, external lighting state or a route history. For example, the UE may broadcast a CAM and latency of the CAM may be less than 100 ms. For example, when unexpected situations such as vehicle breakdown or accidents occur, the UE may generate and transmit a DENM to another UE. For example, all vehicles in a transmission range of the UE may receive the CAM and/or the DENM. In this case, the DENM may have higher priority than the CAM.

Thereafter, in relation to V2X communication, various V2X scenarios are being presented in NR. For example, various V2X scenarios may include vehicle platooning, advanced driving, extended sensors, remote driving or the like.

For example, based on vehicle platooning, vehicles may be dynamically grouped and moved together. For example, in order to perform platoon operations based on vehicle platooning, vehicles belonging to the group may receive periodic data from a leading vehicle. For example, the vehicles belonging to the group may increase or decrease a distance between the vehicles using the periodic data.

For example, based on advanced driving, vehicles may be semi-automated or fully automated. For example, each vehicle may adjust trajectories or maneuvers based on data obtained by a local sensor of an adjacent vehicle and/or an adjacent logical entity. In addition, for example, each vehicle may share driving intension with adjacent vehicles.

For example, based on extended sensors, raw data obtained through local sensors, processed data or live video data may be mutually exchanged between a vehicle, a logical entity, UEs of pedestrians and/or a V2X application server. Accordingly, the vehicle may recognize more improved environment than an environment which may be detected using its own sensor.

For example, based on remote driving, for a person who cannot drive or a remote vehicle located in a dangerous environment, a remote driver or a V2X application may operate or control the remote vehicle. For example, when a route is capable of being predicted like public transportation, cloud computing based driving may be used for operation or control of the remote vehicle. In addition, for example, access to a cloud-based back-end service platform may be considered for remote driving.

Meanwhile, a method of embodying service requirements for various V2X scenarios such as vehicle platooning, advanced driving, extended sensors, remote driving or the like has been discussed in NR based V2X communication.

DISCLOSURE

Technical Problem

An object is to provide a method of preventing channel state estimation performance and/or decoding performance from deteriorating due to a change in voltage gain by transmitting a control signal for restraining the change in voltage gain to a plurality of antenna remote units, and efficiently performing channel state estimation and decoding according to a combination of a plurality of received signals.

The technical problems are not limited to the above technical problems and other technical problems which are not described herein will become apparent to those skilled in the art from the following description.

Technical Solution

A method for controlling a plurality of antenna remote units by a user equipment (UE) in a wireless communication system supporting sidelink may include determining a first time interval based on channel state estimation capability or decoding capability, transmitting a control signal to each of the plurality of antenna remote units based on the first time interval, and performing channel state estimation or signal decoding based on a plurality of signals received by each of the plurality of antenna remote units. The control signal may include control information indicating fixing of voltage gain of each of the plurality of antenna remote units during the first time interval.

The first time interval may be determined based on a sampling time for signals necessary for channel estimation and a processing time for the channel estimation.

The control information may further include information on an OFDM symbol or slot corresponding to the first time interval.

The control information may further include information on a subframe or slot boundary corresponding to the first time interval.

The control information may further include information related to a sampling boundary of a fast Fourier transform (FFT) or inverse FFT (IFFT) corresponding to the first time interval.

Each of the plurality of antenna remote units may include an automatic gain control (AGC) controller for controlling the voltage gain, and the control signal may restrain the AGC controller from changing the voltage gain.

The method may further include receiving gain information from each of the plurality of antenna remote units.

The method may further include determining a weight for each antenna remote unit based on the gain information, and performing a combination of the plurality of signals based on the determined weight.

The combination of the plurality of signals may be performed according to a maximal ratio combining (MRC) scheme.

The weight is a value for correcting a difference in noise power related to each antenna remote unit.

The gain information may be determined based on an output value of an analog-to-digital converter (ADC) in each of the plurality of antenna remote units and a voltage applied to the UE.

The control information may further comprise power information determined based on uplink power control information according to DCI received from a base station.

According to another aspect, a chipset for controlling a plurality of antenna remote units in a wireless communication system supporting sidelink may include at least one processor, and at least one memory operatively connected to the at least one processor and configured to enable the at least one processor to perform operation when executed. The operation may include determining a first time interval based on channel state estimation capability or decoding capability, transmitting a control signal to each of the plurality of antenna remote units based on the first time interval, and performing channel state estimation or signal decoding based on a plurality of signals received by each of the plurality of antenna remote units, and the control signal may include control information indicating fixing of voltage gain of each of the plurality of antenna remote units during the first time interval.

According to another aspect, a user equipment (UE) for controlling a plurality of antenna remote units in a wireless communication system supporting sidelink may include the plurality of antenna remote units, and a central unit electrically connected to the plurality of antenna remote units. The central unit may be configured to determine a first time interval based on channel state estimation capability or decoding capability, to transmit a control signal to each of the plurality of antenna remote units based on the first time interval, and to perform channel state estimation or signal decoding based on a plurality of signals respectively received by the plurality of antenna remote units, and the control signal may include control information indicating fixing of voltage gain of each of the plurality of antenna remote units during the first time interval.

The processor may adjust a driving mode of a device connected to the chipset based on a predetermined time

Advantageous Effects

According to various embodiments, it is possible to prevent channel state estimation performance and/or decoding performance from deteriorating due to a change in voltage gain by transmitting a control signal for restraining the change in voltage gain to a plurality of antenna remote units and to efficiently perform channel state estimation and decoding according to a combination of a plurality of received signals.

It will be appreciated by persons skilled in the art that that the effects that can be achieved through the present disclosure are not limited to what has been particularly described hereinabove and other advantages of the present invention will be more clearly understood from the detailed description.

DESCRIPTION OF DRAWINGS

The accompanying drawings, which are included to provide a further understanding of the invention, illustrate embodiment(s) of the invention and together with the description serve to explain the principle of the invention.

MODE FOR INVENTION

Figure 1:
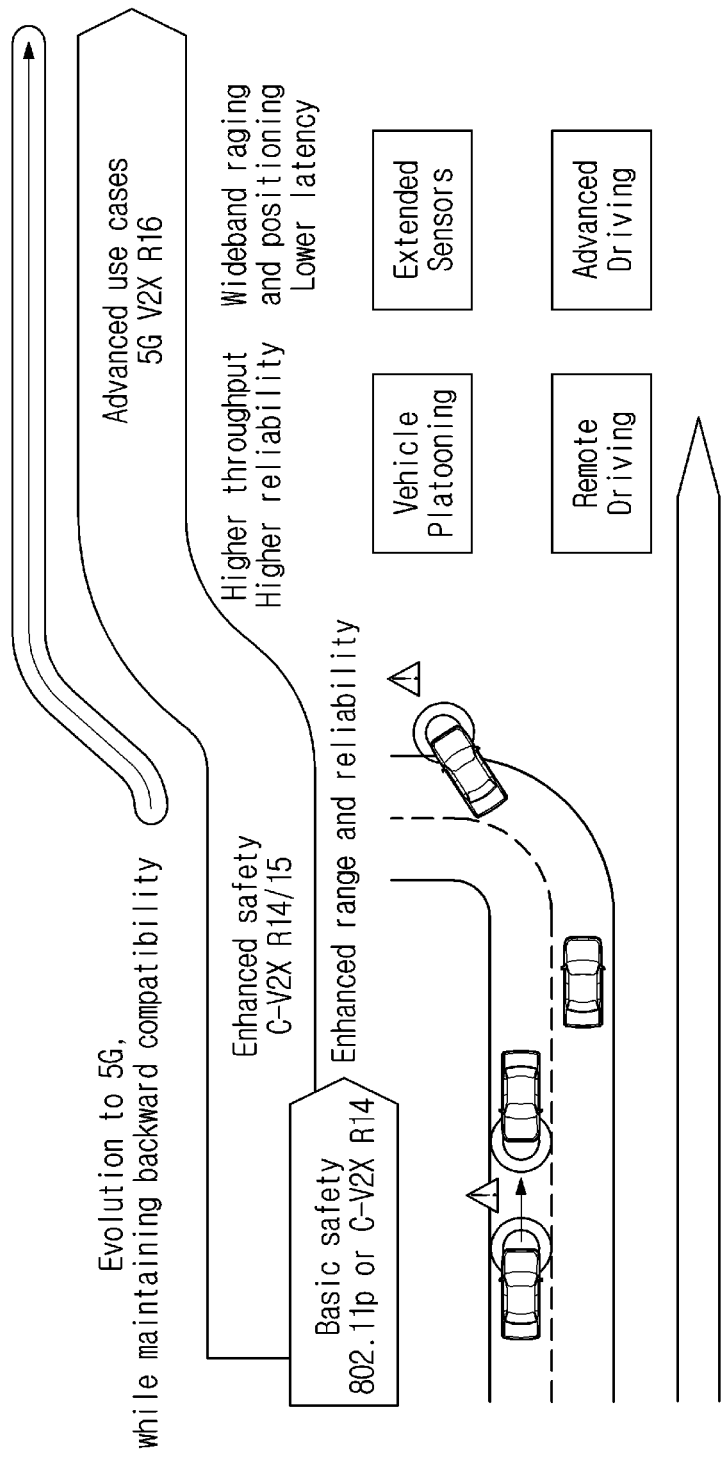
FIG. 1 is a view illustrating comparison between V2X communication based on RAT before NR and V2X communication based on NR.

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the embodiments will not be limited only to this.

Figure 2:
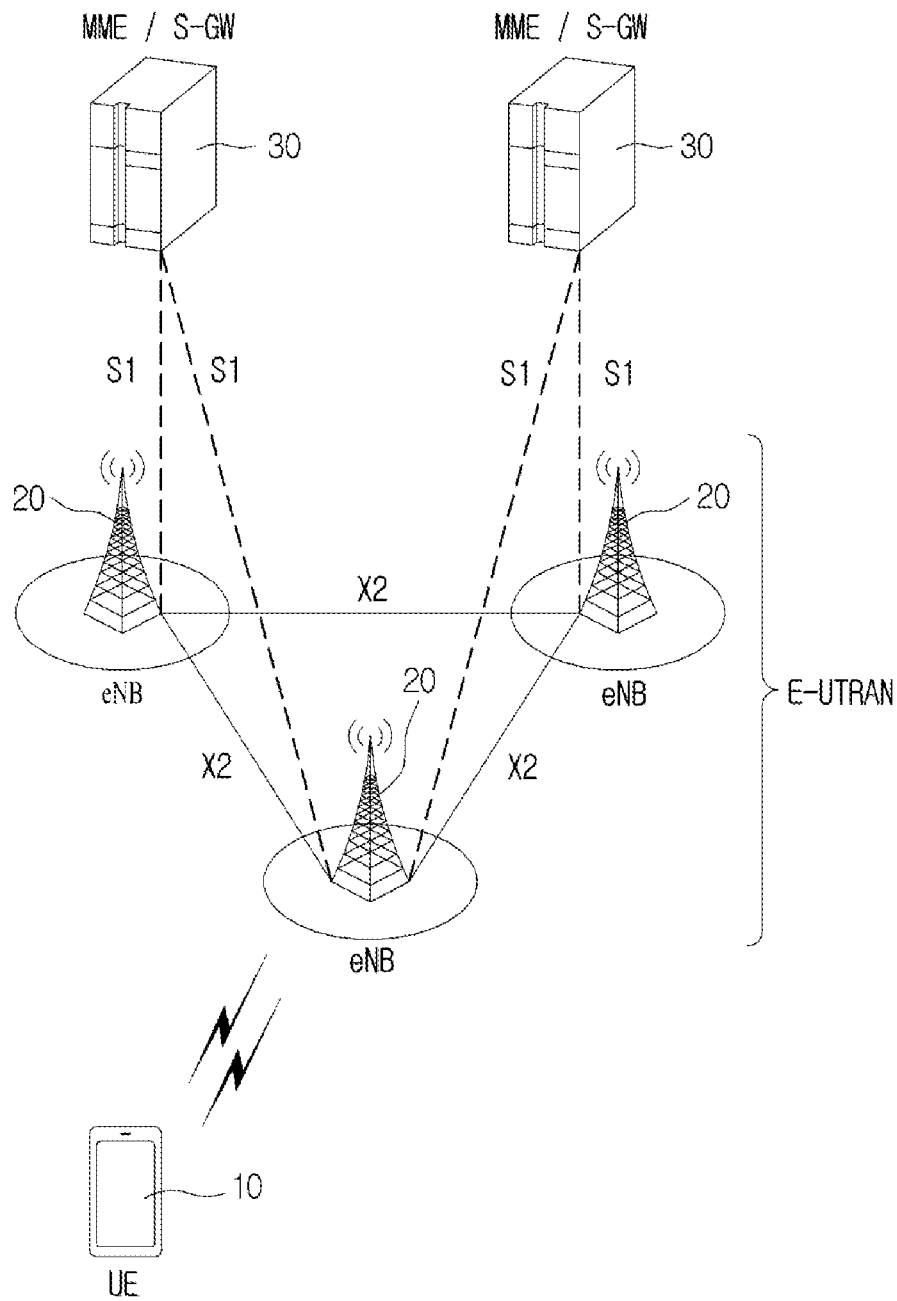
FIG. 2 illustrates a structure of an LTE system.

FIG. 2 illustrates a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 2, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicates with the UE 10 and may also be referred to by using different terms, such as evolved-NodeB (eNB), Base Transceiver System (BTS), Access Point (AP), and so on.

The base stations 20 are interconnected to one another through an X2 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 3:
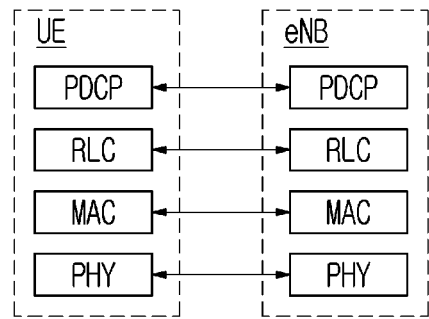
FIG. 3 illustrates a radio protocol architecture of a user plane.

FIG. 3 illustrates a radio protocol architecture of a user plane.

Figure 4:
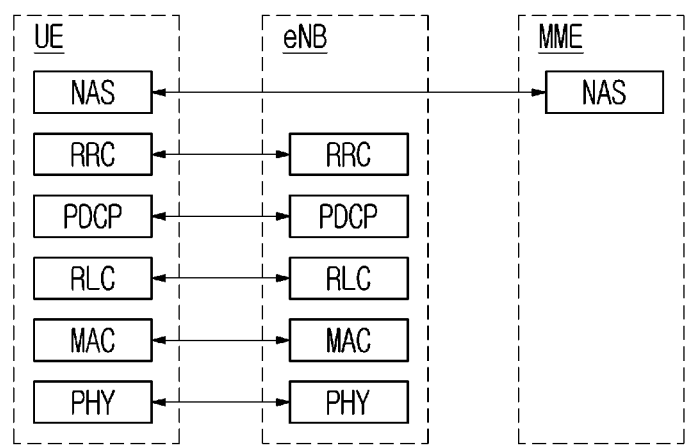
FIG. 4 illustrates a radio protocol architecture of a control plane.

FIG. 4 illustrates a radio protocol architecture of a control plane. The user plane is a protocol stack for user data transmission, and the control plane is a protocol stack for control signal transmission.

Referring to FIG. 3 and FIG. 4, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 5:
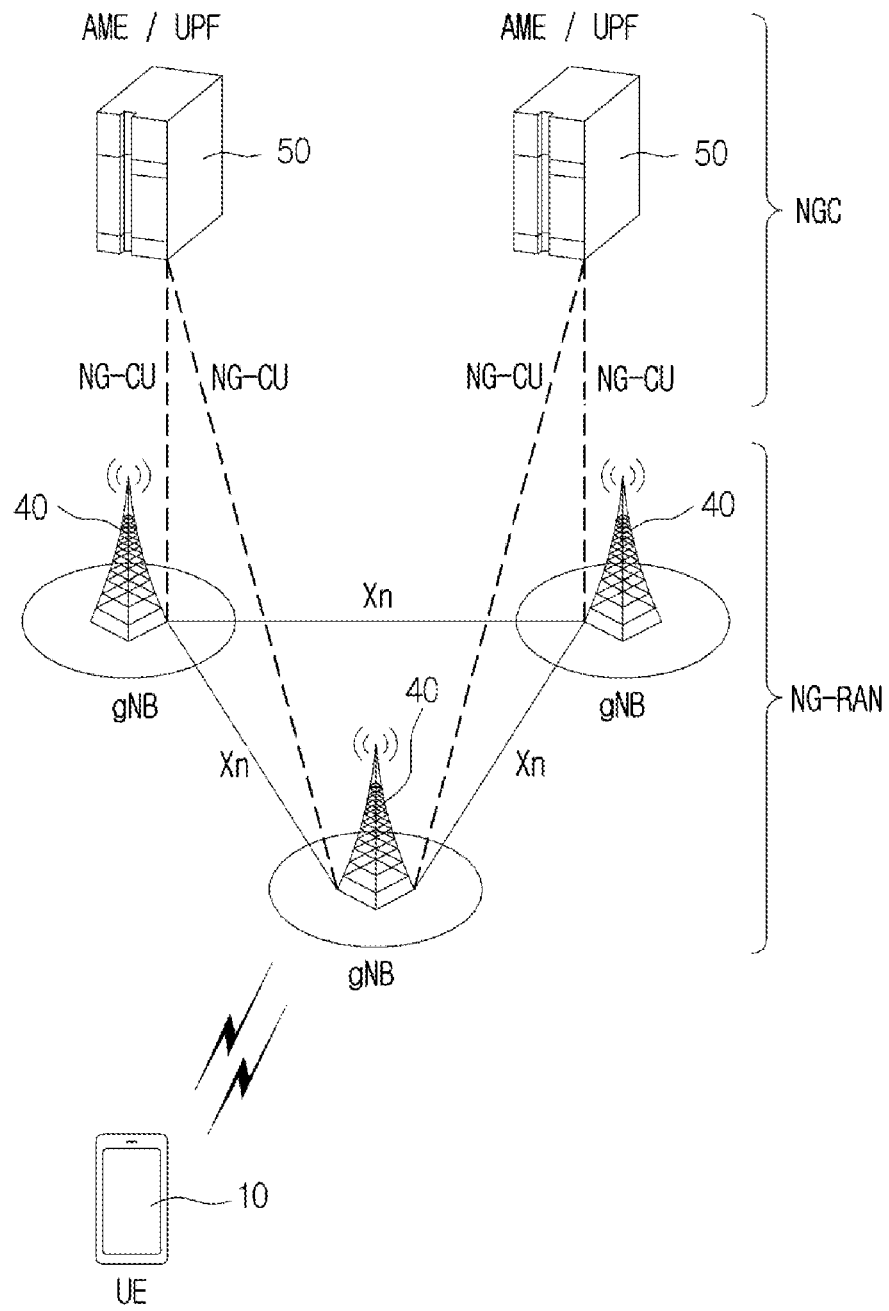
FIG. 5 illustrates a structure of an NR system.

FIG. 5 illustrates a structure of an NR system.

Figure 10:
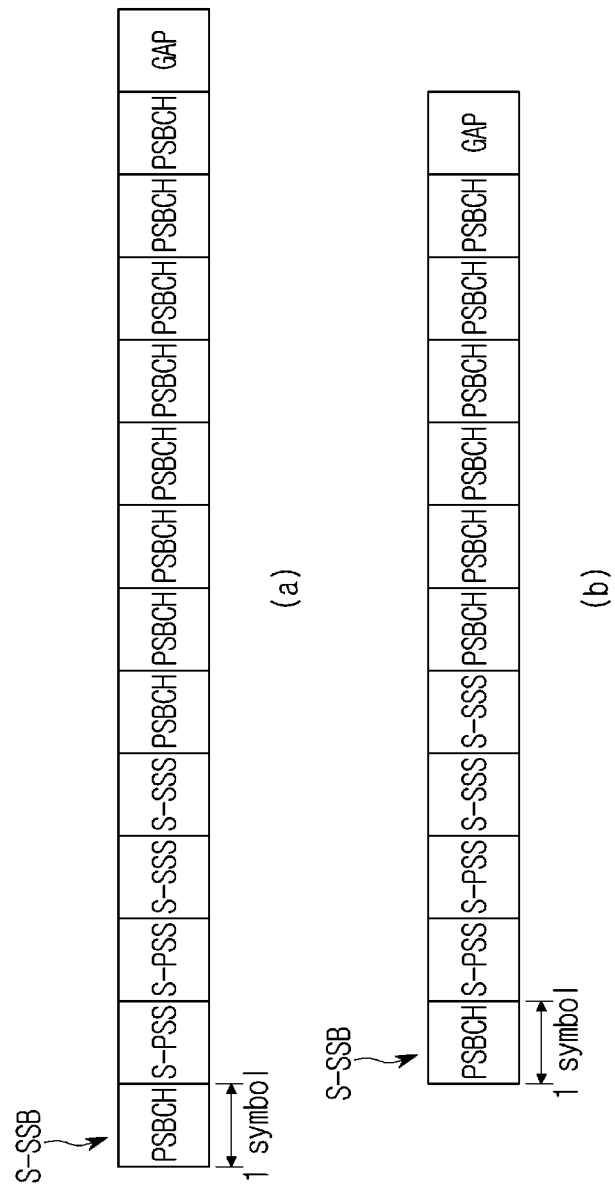
FIG. 10 illustrates a structure of an S-SSB according to a CP type.

Referring to FIG. 5, a Next Generation-Radio Access Network (NG-RAN) may include a next generation-Node B (gNB) and/or eNB providing a user plane and control plane protocol termination to a user. FIG. 10 shows a case where the NG-RAN includes only the gNB. The gNB and the eNB are connected to one another via Xn interface. The gNB and the eNB are connected to one another via 5$^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 6:
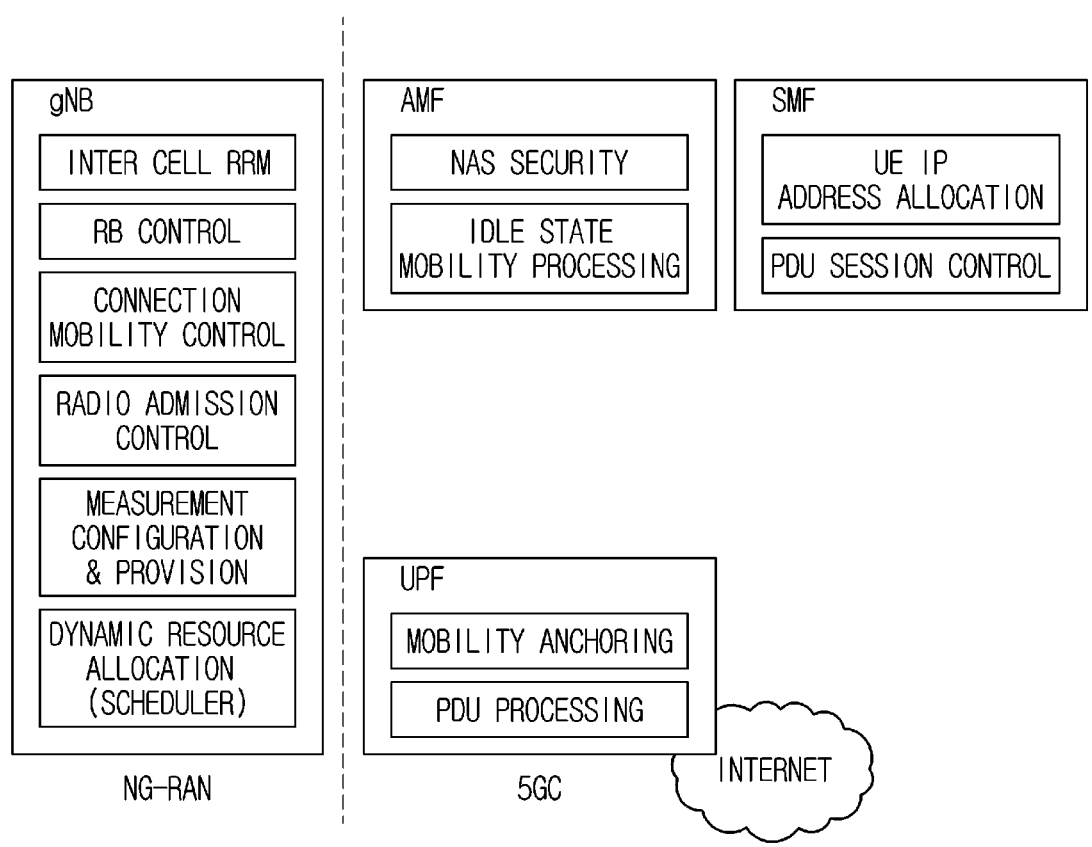
FIG. 6 illustrates a functional division between an NG-RAN and a 5GC.

FIG. 6 illustrates a functional division between an NG-RAN and a 5GC.

Referring to FIG. 6, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 7:
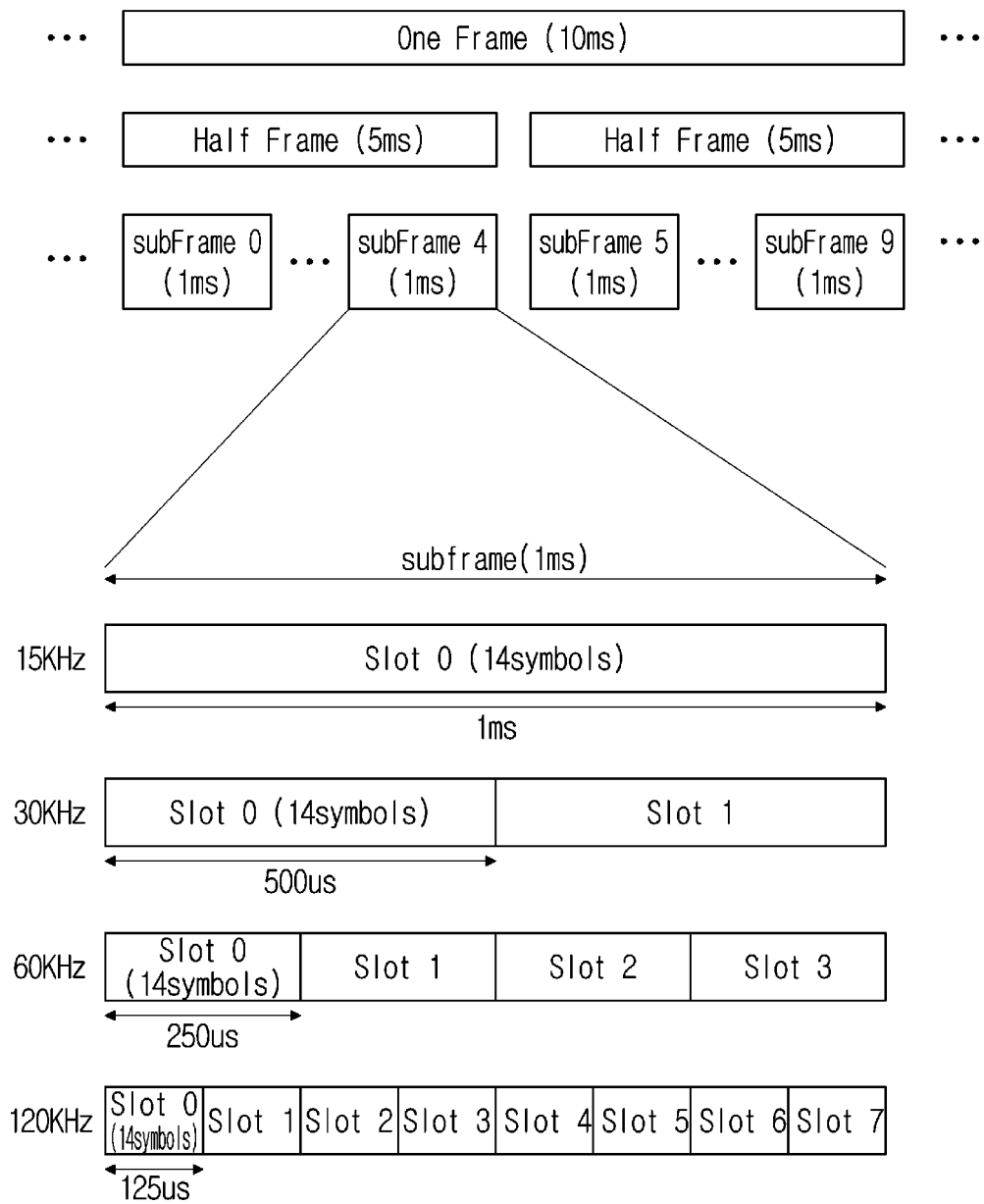
FIG. 7 illustrates a structure of a radio frame of an NR.

FIG. 7 illustrates a structure of a radio frame of an NR.

Referring to FIG. 7, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * 2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * 2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., autonomous driving).

TABLE 4

| Frequency Range designation | Corresponding frequency range | Subcarrier Spacing (SCS) |
|---|---|---|
| FR1 | 410MHz-7125 MHz | 15, 30, 60 kHz |
| FR2 | 24250MHz-52600 MHz | 60, 120, 240 kHz |

Figure 8:
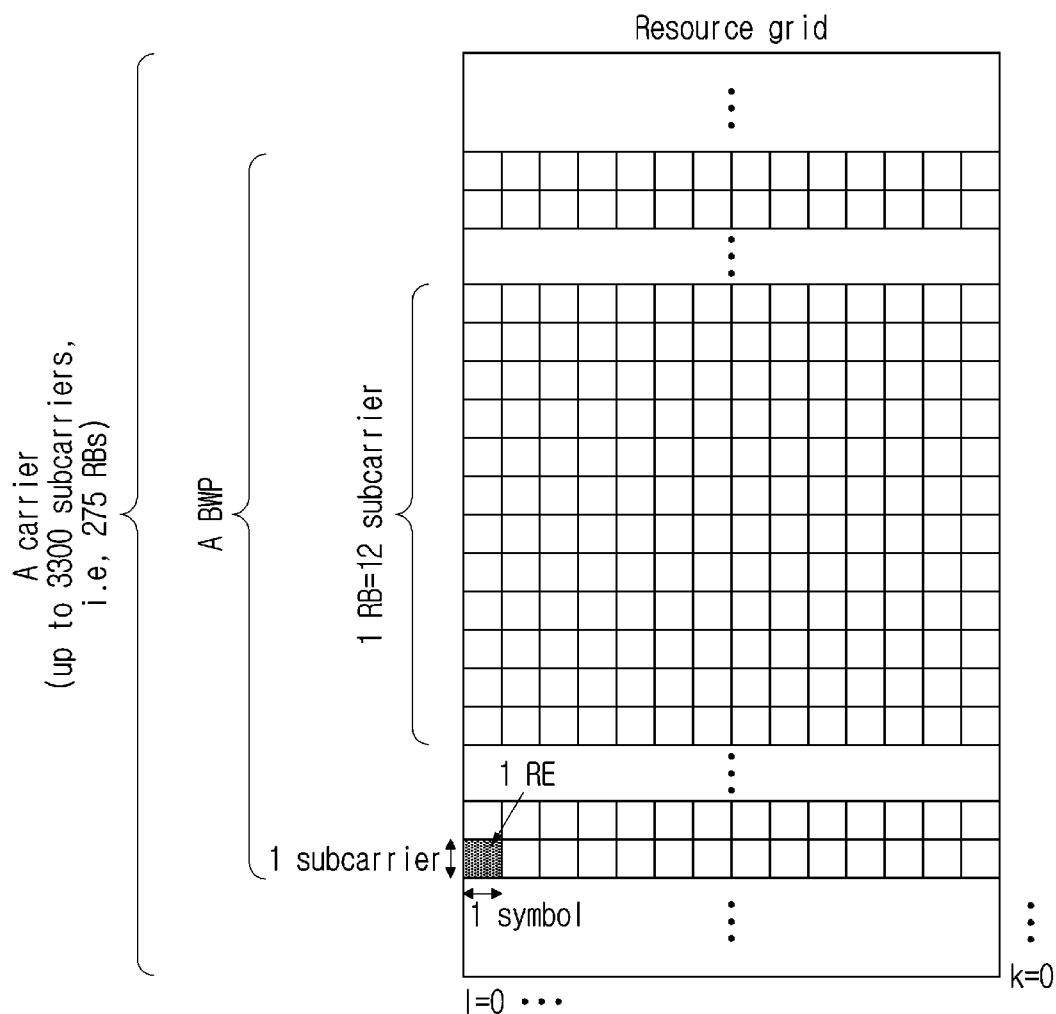
FIG. 8 illustrates a structure of a slot of an NR frame.

FIG. 8 illustrates a structure of a slot of an NR frame.

Referring to FIG. 8, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and a UE or a radio interface between a UE and a network may be composed of Layer L1, Layer L2 and Layer L3. In various embodiments of the present disclosure, Layer L1 may mean a physical layer. In addition, for example, Layer L2 may mean at least one of a MAC layer, an RLC layer, a PDCP layer and an SDAP layer. In addition, Layer L3 may mean an RRC layer.

Hereinafter, V2X or SL communication will be described.

Figure 9:
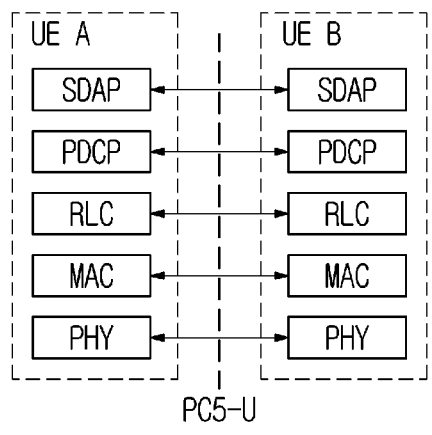
FIG. 9 illustrates a protocol stack for a SL communication.
Figure 9:
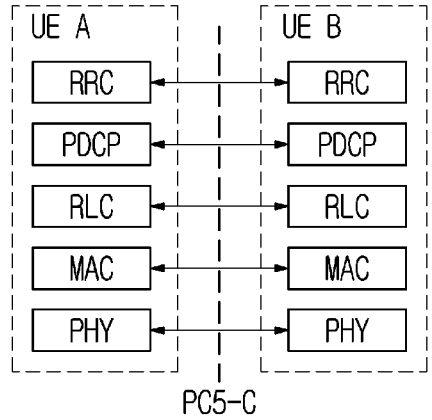

FIG. 9 illustrates a protocol stack for a SL communication. More specifically, (a) of FIG. 9 illustrates a user plane protocol stack of NR, and (b) of FIG. 9 illustrates a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS). For example, length-127 M-sequences may be used for an S-PSS and length-127 Gold sequences may be used for an S-SSS. For example, a UE may detect an initial signal using the S-PSS and obtain synchronization. For example, the UE may obtain detailed synchronization using the S-PSS and the S-SSS and detect a synchronization signal ID.

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on. For example, for evaluation of PSBCH performance, in NR V2X, a payload size of a PSBCH may be 56 bits including 24-bit CRC.

The S-PSS, the S-SSS, and the PSBCH may be included in a block format (e.g., a SL SS/PSBCH block, hereinafter referred to as Sidelink-Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). For example, the bandwidth of the S-SSB may be 11 resource blocks (RBs). For example, The PSBCH may cover 11 RBs. And, a frequency position of the S-SSB may be (pre-) configured. Therefore, the UE is not required to perform a hypothesis detection in order to discover the S-SSB in the carrier.

Meanwhile, in the NR SL system, a plurality of numerologies having different SCSs and/or CP lengths may be supported. As the SCS increases, the length of time resource used for a transmission UE to transmit the S-SSB may be reduced. Therefore, the coverage of the S-SSB may be reduced. Accordingly, in order to secure the coverage of the S-SSB, the transmission UE may transmit one or more S-SSB to the reception UE in one S-SSB transmission period according to the SCS. For example, the number of S-SSBs transmitted from the transmission UE to the reception UE in one S-SSB transmission period may be pre-configured or configured. For example, the S-SSB transmission period may be 1650 ms. For example, for all SCSs, an S-SSB transmission period of 160 ms may be supported.

For example, when the SCS is 15 kHz at FR1, the transmission UE may transmit one or two S-SSBs to the reception UE in one S-SSB transmission period. For example, when the SCS is 30 kHz at FR1, the transmission UE may transmit one or two S-SSBs to the reception UE in one S-SSB transmission period. For example, when the SCS is 60 kHz at FR1, the transmission UE may transmit one, two or four S-SSBs to the reception UE in one S-SSB transmission period.

For example, when the SCS is 60 kHz at FR2, the transmission UE may transmit 1, 2, 4, 8, 16 or 32 S-SSBs to the reception UE in one S-SSB transmission period. For example, when the SCS is 120 kHz at FR2, the transmission UE may transmit 1, 2, 4, 8, 16, 32 or 64 S-SSBs to the reception UE in one S-SSB transmission period.

Meanwhile, when the SCS is 60 kHz, two types of CPs may be supported. In addition, the structure of the S-SSB transmitted from the transmission UE to the reception UE may vary according to the CP type. For example, the CP type may be a normal CP (NCP) or an extended CP (ECP). Specifically, for example, when the CP type is a NCP, the number of symbols, to which a PSBCH is mapped, in the S-SSB transmitted by the transmission UE may be 9 or 8. In contrast, for example, when the CP type is an ECP, the number of symbols, to which the PSBCH is mapped, in the S-SSB transmitted by the transmission UE may be 7 or 6. For example, the PSBCH may be mapped to a first symbol in the S-SSB transmitted by the transmission UE. For example, the reception UE for receiving the S-SSB may perform automatic gain control (AGC) operation in a first symbol duration of the S-SSB.

FIG. 10 illustrates a structure of an S-SSB according to a CP type. FIG. 10(a) shows the structure of the S-SSB when the CP type is a NCP.

Figure 20:
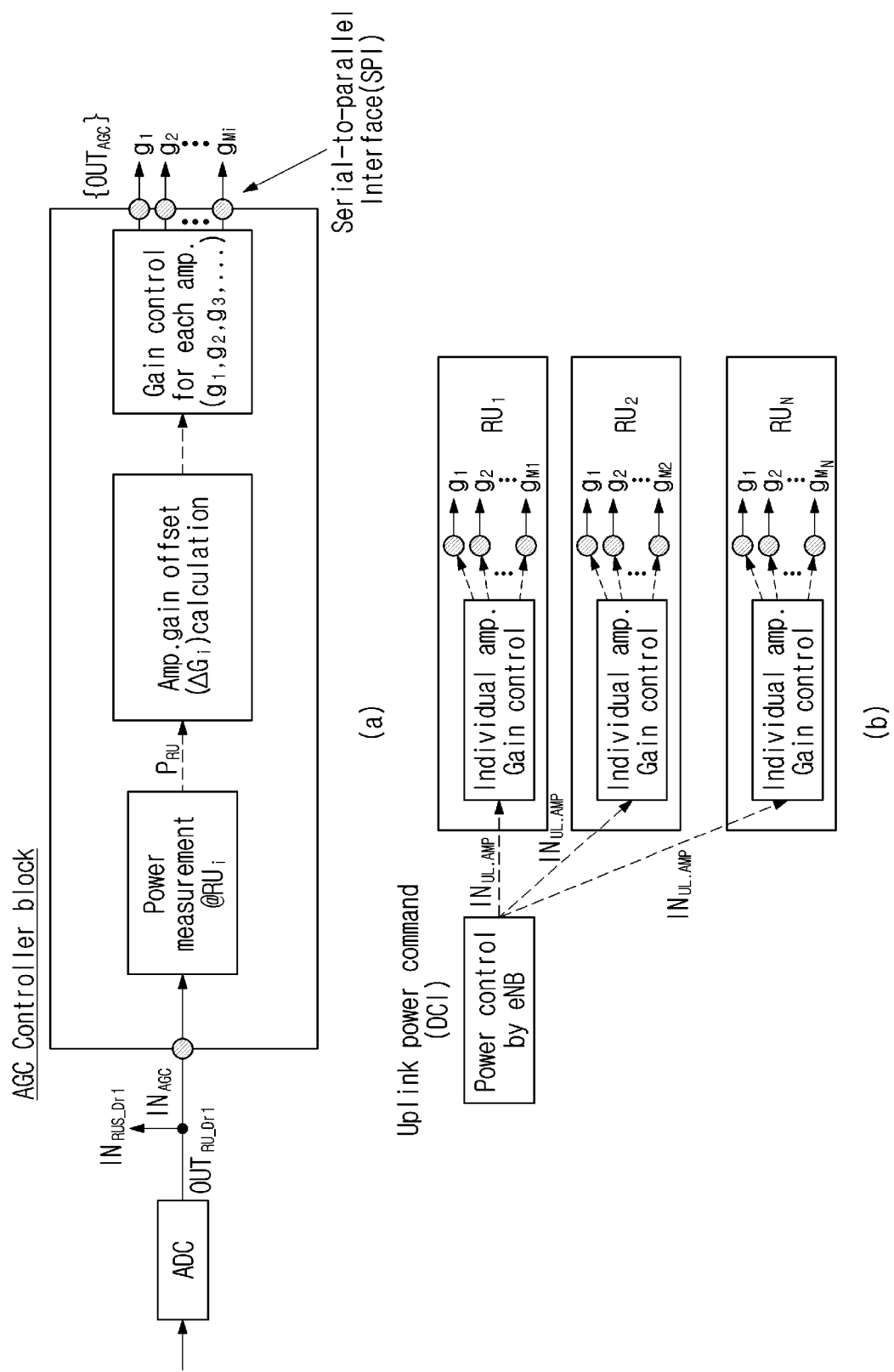
FIG. 20 is a view illustrating an algorithm performed in an AGC/AFC processor.

For example, when the CP type is a NCP, for the structure of the S-SSB, that is, the order of symbols, to which the S-PSS, the S-SSS and the PSBCH are mapped, are mapped in the S-SSB transmitted by the transmission UE, refer to FIG. 20.

FIG. 10(b) shows the structure of the S-SSB when the CP type is an ECP.

For example, when the CP type is an ECP, unlike FIG. 20, the number of symbols, to which the PSBCH is mapped, after the S-SSS in the S-SSB transmitted by the transmission UE may be 6. Accordingly, the coverage of the S-SSB may vary depending on whether the CP type is a NCP or an ECP.

Meanwhile, each SLSS may have a sidelink synchronization identifier (SLSS ID).

For example, in the case of LTE SL or LTE V2X, based on a combination of two different S-PSS sequences and 168 different S-SSS sequences, the value of the SLSS ID may be defined. For example, the number of SLSS IDs may be 336. For example, the value of the SLSS ID may be any one of 0 to 335.

For example, in the case of NR SL or NR V2X, based on a combination of two different S-PSS sequences and 336 different S-SSS sequences, the value of the SLSS ID may be defined. For example, the number of SLSS IDs may be 672. For example, the value of the SLSS ID may be any one of 0 to 671. For example, between the two different S-PSSs, one S-PSS may be associated with in-coverage and the other S-PSS may be associated with out-of-coverage. For example, the SLSS IDs of 0 to 335 may be used in in-coverage and SLSS IDs of 336 to 671 may be used in out-of-coverage.

Meanwhile, the transmission UE needs to optimize transmit power according to the characteristics of each signal configuring the S-SSB in order to improve the S-SSB reception performance of the reception UE. For example, according to a peak to average power ratio (PAPR) of each signal configuring the S-SSB, the transmission UE may determine a maximum power reduction (MPR) value for each signal. For example, when the PAPR value differs between the S-PSS and the S-SSS configuring the S-SSB, in order to improve the S-SSB reception performance of the reception UE, the transmission UE may apply optimal MPR values to transmission of the S-PSS and the S-SSS. In addition, for example, in order for the transmission UE to perform amplification operation with respect to each signal, a transient period is applicable. The transient period may preserve a time necessary for a transmission amplifier of the transmission UE to perform normal operation in a boundary where the transmit power of the transmission UE varies. For example, in the case of FR1, the transient period may be 10 us. For example, in the case of FR2, the transient period may be 5 us. For example, a search window necessary for the reception UE to search for the S-PSS may be 80 ms and/or 160 ms.

Figure 11:
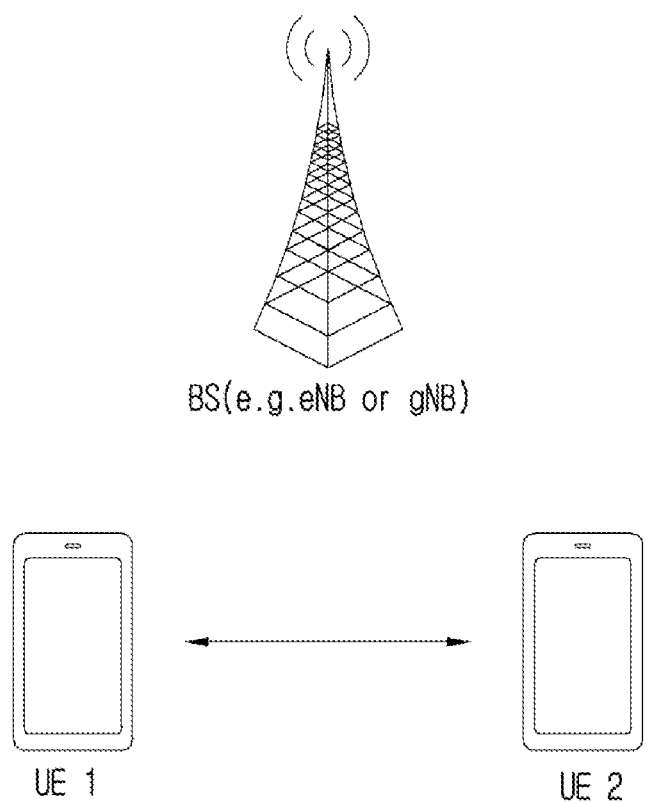
FIG. 11 illustrates a UE performing V2X or SL communication.

FIG. 11 illustrates a UE performing V2X or SL communication.

Referring to FIG. 11, in V2X or SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal). For example, a UE 1 may be a first device 100 and a UE 2 may be a second device 200.

For example, the user equipment 1 (UE1) may select a resource unit corresponding to a specific resource within a resource pool, which refers to a set of resources. And, the UE1 may transmit a SL signal by using the resource unit. For example, the user equipment 2 (UE2), which is to a receiving UE, may be configured with a resource pool to which UE1 can transmit signals, and may then detect signals of UE1 from the resource pool.

Herein, in case the UE1 is within a connection range of the base station, the base station may notify the resource pool to the UE1. Conversely, in case the UE1 is outside a connection range of the base station, another UE may notify the resource pool to the UE1 or the UE 1 may use a pre-configured resource pool.

Generally, a resource pool may be configured in a plurality of resource units, and each UE may select one resource unit or a plurality of resource units and may use the selected resource unit(s) for its SL signal transmission.

Figure 12:
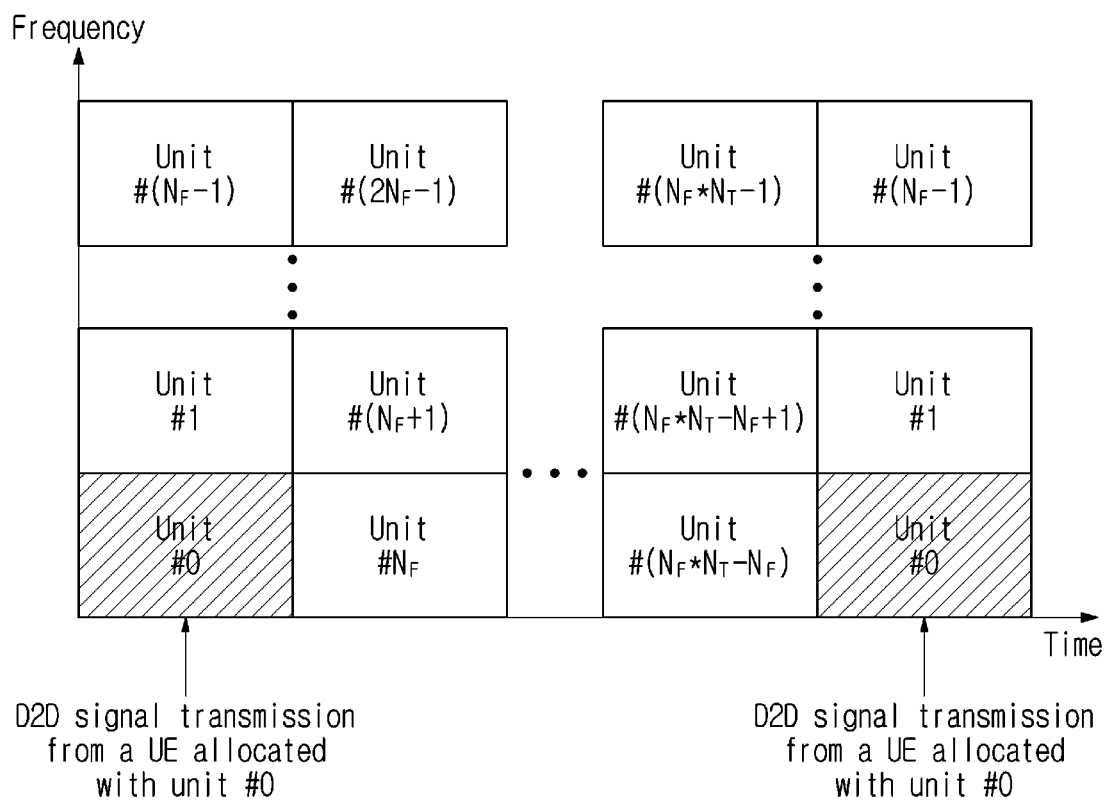
FIG. 12 illustrates a resource unit for V2X or SL communication.

FIG. 12 illustrates a resource unit for V2X or SL communication.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may correspond to a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel. For example, the transmission UE may map a PSSCH to continuous PRBs and perform transmission.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 13:
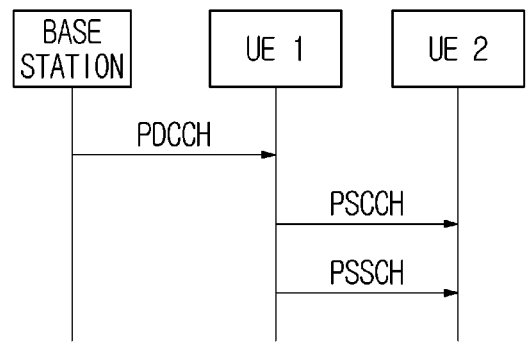
FIG. 13 illustrates a procedure of performing V2X or SL communication by a UE according to a transmission mode.
Figure 13:
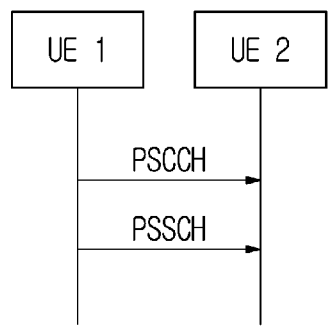

FIG. 13 illustrates a procedure of performing V2X or SL communication by a UE according to a transmission mode. In various embodiments of the present disclosure, a transmission mode may be referred to as a mode or a resource allocation mode. Hereinafter, for convenience of description, the transmission mode may be referred to as an LTE transmission mode in LTE and may be referred to as an NR resource allocation mode in NR.

Figure 24:
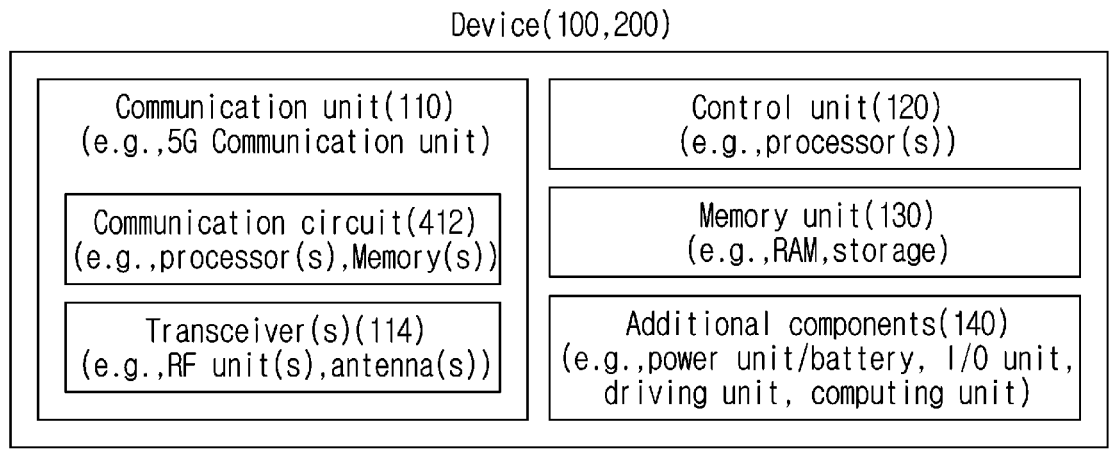
FIG. 24 illustrates another example of a wireless device applied to the present invention. The wireless device may be implemented in various forms according to a use-case/service.

For example, (a) of FIG. 13 shows UE operation related to LTE transmission mode 1 or LTE transmission mode 3. Alternatively, (a) of FIG. 24 shows UE operation related to NR resource allocation mode 1. For example, LTE transmission mode 1 is applicable to normal SL communication and LTE transmission mode 3 is applicable to V2X communication.

For example, (b) of FIG. 13 shows UE operation related to LTE transmission mode 2 or LTE transmission mode 4. Alternatively, (b) of FIG. 24 shows UE operation related to NR resource allocation mode 2.

Referring to (a) of FIG. 13, in LTE transmission mode 1, LTE transmission mode 3 or NR resource allocation mode 1, a base station may schedule SL resource to be used by a UE for SL transmission. For example, the base station may perform resource scheduling through a PDCCH (more specifically, downlink control information (DCI)) with respect to the UE 1 and the UE 1 may perform V2X or SL communication with the UE 2 according to the resource scheduling. For example, the UE 1 may transmit sidelink control information (SCI) to the UE 2 through a physical sidelink control channel (PSCCH) and then transmit data based on the SCI to the UE 2 through a physical sidelink shared channel (PSSCH).

For example, in NR resource allocation mode 1, the UE may be provided with or allocated one or more resources for SL transmission of one transport block (TB) from the base station through dynamic grant. For example, the base station may provide resource for PSCCH and/or PSSCH transmission to the UE using dynamic grant. For example, the transmission UE may report a SL hybrid automatic repeat request (HARQ) feedback received from the reception UE to the base station. In this case, based on an indication in the PDCCH for the base station to allocate resource for SL transmission, PUCCH resource and timing for reporting the SL HARQ feedback to the base station may be determined.

For example, DCI may represent a slot offset between DCI reception and first SL transmission scheduled by DCI. For example, a minimum gap between DCI for scheduling SL transmission resource and first scheduled SL transmission resource may not be less than a processing time.

For example, in NR resource allocation mode 1, the UE may be periodically provided with or allocated a resource set from the base station for transmission of a plurality of SLs through configured grant. For example, the configured grant may include configured grant type 1 or configured grant type 2. For example, the UE may determine a TB to be transmitted in occasions indicated by given configured grant.

For example, the base station may allocate SL resource to the UE on the same carrier or allocate SL resource to the UE on different carriers.

For example, an NR base station may control LTE based SL communication. For example, the NR base station may transmit NR DCI to the UE to schedule LTE SL resource. In this case, for example, a new RNTI for scrambling the NR DCI may be defined. For example, the UE may include an NR SL module and an LTE SL module.

For example, after a UE including an NR SL module and an LTE SL module receives NR SL DCI from a gNB, the NR SL module may convert NR SL DCI into LTE DCI type 5A, and the NR SL module may transmit LTE DCI type 5A to the LTE SL module in units of X ms. For example, after the LTE SL module receives LTE DCI format 5A from the NR SL module, the LTE SL module may apply activation and/or release to a first LTE subframe after Z ms. For example, X may be dynamically represented using a field of DCI. For example, the minimum value of X may vary according to UE capability. For example, the UE may report a single value according to UE capability. For example, X may be a positive number.

Referring to (b) of FIG. 13, in LTE transmission mode 2, LTE transmission mode 4 or NR resource allocation mode 2, the UE may determine SL transmission resource in SL resource configured by the base station/network or pre-configured SL resource. For example, the configured SL resource or the pre-configured SL resource may be a resource pool. For example, the UE may autonomously select or schedule resource for SL transmission. For example, the UE may autonomously select resource in the configured resource pool and perform SL communication. For example, the UE may sensing and resource (re)selection procedure and autonomously select resource within the selection window. For example, sensing may be performed in units of subchannels. In addition, the UE 1 which has selected resource in the resource pool may transmit SCI to the UE 2 through the PSCCH and then transmit data based on the SCI to the UE 2 through the PSSCH.

For example, the UE may help SL resource selection for another UE. For example, in NR resource allocation mode 2, the UE may receive configured grant for SL transmission. For example, in NR resource allocation mode 2, the UE may schedule SL transmission of another UE. For example, in NR resource allocation mode 2, the UE may reserve SL resource for blind retransmission.

For example, in NR resource allocation mode 2, a first UE may indicate priority of SL transmission to a second UE using SCI. For example, the second UE may decode the SCI and the second UE may perform sensing and/or resource (re)selection based on the priority. For example, the resource (re)selection procedure may include identifying candidate resources in a resource selection window and selecting resource for (re)transmission from the identified candidate resources. For example, the resource selection window may be a time interval when a UE selects resource for SL transmission. For example, after the second UE triggers resource (re)selection, the resource selection window may start at T1≥0 and the resource selection window may be restricted by the remaining packet delay budget of the second UE. For example, in step in which the second UE identifies the candidate resources in the resource selection window, when specific resource is indicated by SCI received by the second UE from the first UE and an L1 SL RSRP measurement value for the specific resource exceeds an SL RSRP threshold, the second UE may not determine the specific resource as candidate resource. For example, the SL RSRP threshold may be determined based on priority of SL transmission indicated by the SCI received by the second UE from the first UE and priority of SL transmission on the resource selected by the second UE.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be equal or similar to the frequency domain pattern of the PSSCH DMRS. For example, an accurate DMRS pattern may be indicated by SCI. For example, in NR resource allocation mode 2, a transmission UE may select a specific DMRS pattern among DMRS patterns configured or pre-configured for a resource pool.

For example, in NR resource allocation mode 2, based on the sensing and resource (re)selection procedure, the transmission UE may perform initial transmission of a transport block (TB) without reservation. For example, based on the sensing and resource (re)selection procedure, the transmission UE may reserve SL resource for initial transmission of a second TB using SCI associated with a first TB.

For example, in NR resource allocation mode 2, a UE may reserve resource for PSSCH retransmission based on feedback through signaling related to previous transmission of the same TB. For example, the maximum number of SL resources reserved by one transmission including current transmission may be 2, 3 or 4. For example, the maximum number of SL resources may be the same regardless of whether HARQ feedback is enabled or not. For example, the maximum number of times of HARQ (re)transmission for one TB may be restricted by configuration or pre-configuration. For example, the maximum number of times of HARQ (re)transmission may be a maximum of 32. For example, when there is no configuration or pre-configuration, the maximum number of times of HARQ (re)transmission may not be designated. For example, the configuration or reconfiguration may be for the transmission UE. For example, in NR resource allocation mode 2, HARQ feedback for releasing resource which is not used by the UE may be supported.

For example, in NR resource allocation mode 2, the UE may indicate one or more subchannels and/or slots used by the UE to another UE using SCI. For example, the UE may indicate one or more subchannels and/or slots reserved by the UE to another UE for PSSCH (re)transmission using SCI. For example, a minimum allocation unit of SL resource may be a slot. For example, a size of a subchannel may be configured or preconfigured for the UE.

Hereinafter, sidelink control information (SCI) will be described.

Control information transmitted from a base station to a UE through a PDCCH may be referred to as downlink control information (DCI), control information transmitted from a UE to another UE through a PSCCH may be referred to as SCI. For example, the UE may know a start symbol of the PSCCH and the number of symbols of the PSCCH before decoding the PSCCH. For example, the SCI may include SL scheduling information. For example, the UE may transmit one or more SCI to another UE to schedule the PSSCH. For example, one or more SCI formats may be defined.

For example, a transmission UE may transmit SCI to a reception UE on a PSCCH. The reception UE may decode one SCI to receive a PSSCH from the transmission UE.

For example, the transmission UE may transmit two continuous SCI (e.g., 2-stage SCI) to the reception UE on a PSCCH and/or a PSSCH. The reception UE may decode two continuous SCI (e.g., 2-stage SCI) to receive the PSSCH from the transmission UE. For example, when SCI configuration fields are divided into two groups in consideration of a (relatively) high SCI payload size, SCI including a first SCI configuration field group may be referred to as first SCI or 1$^{st}$ SCI and SCI including a second SCI configuration field group may be referred to as second SCI or 2$^{nd}$ SCI. For example, the transmission UE may transmit the first SCI to the reception UE through the PSCCH. For example, the transmission UE may transmit the second SCI to the reception UE on the PSCCH and/or the PSSCH. For example, the second SCI may be transmitted to the reception UE through an (independent) PSCCH or may be piggybacked and transmitted together with data through the PSSCH. For example, two continuous SCI may apply to different transmissions (e.g., unicast, broadcast or groupcast).

For example, the transmission UE may transmit some or all of the following information to the reception UE through SCI. Here, for example, the transmission UE may transmit some or all of the following information to the reception UE through the first SCI and/or the second SCI.

- PSSCH and/or PSCCH related resource allocation information, e.g., position/number of time/frequency resource, resource reservation information (e.g., period), and/or
- SC CSI report request indicator or SL (L1) RSRP (and/or SL (L1) RSRQ and/or SL (L1) RSSI) report request indicator, and/or
- SC CSI transmission indicator (or SL (L1) RSRP (and/or SL (L1) RSRQ and/or SL (L1) RSSI) information transmission indicator) (on the PSSCH), and/or
- MCS information, and/or
- transmit power information, and/or
- L1 destination ID information and/or L1 source ID information, and/or
- SL HARQ process ID information, and/or
- new data indicator (NDI) information, and/or
- redundancy version (RV) information, and/or
- (transmission traffic/packet related) QoS information, e.g., priority information, and/or
- SL CSI-RS transmission indicator or information on the number of (transmitted) SL CSI-RS antenna ports
- position information of the transmission UE or position (or distance region) information of a target reception UE (from which SL HARQ feedback is requested)
- reference signal (e.g., DMRS, etc.) information related to decoding and/or channel estimation of data transmitted through the PSSCH, for example, information related to a pattern of (time-frequency) mapping resource of a DMRS, rank information or antenna port index information;

For example, the first SCI may include information related to channel sensing. For example, the reception UE may decode the second SCI using a PSSCH DMRS. A polar code used for the PDCCH may apply to the second SCI. For example, in a resource pool, a payload size of the first SCI may be the same for unicast, groupcast and broadcast. After decoding the first SCI, the reception UE does not need to perform blind decoding of the second SCI. For example, the first SCI may include scheduling information of the second SCI.

Meanwhile, in various embodiments of the present disclosure, since the transmission UE may transmit at least one of the SCI, the first SCI and/or the second SCI to the reception UE through the PSCCH, the PSCCH may be replaced/substituted with the SCI, the first SCI and/or the second SCI. And/or, for example, the SCI may be replaced/substituted with at least one of the PSCCH, the first SCI and/or the second SCI. And/or, for example, since the transmission UE may transmit the second SCI to the reception UE through the PSSCH, the PSSCH may be replaced/substituted with the second SCI.

Hereinafter, synchronization acquisition of an SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 14:
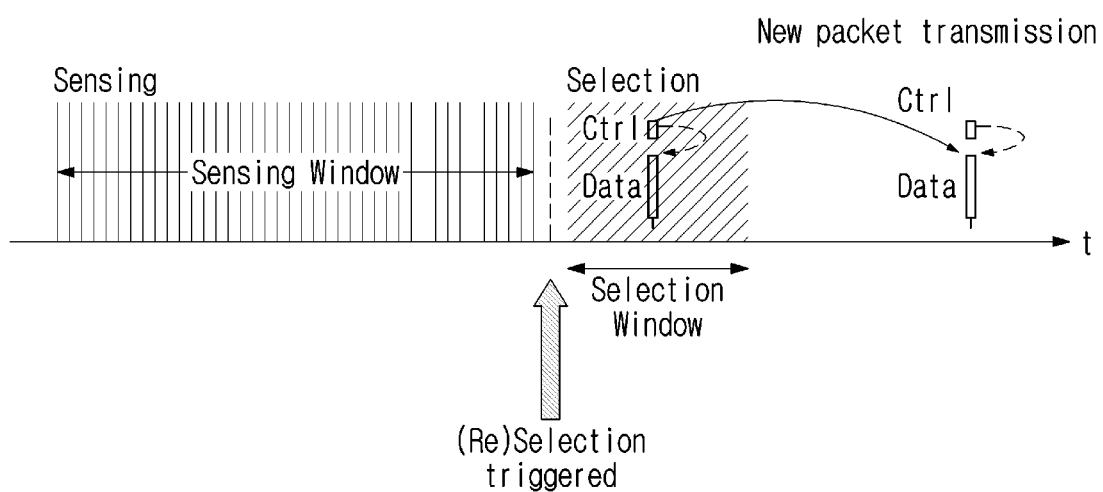
FIG. 14 is a view illustrating a method in which transmit resource of a next packet is reserved in selection of transmit resource.

FIG. 14 is a view illustrating a method in which transmit resource of a next packet is reserved in selection of transmit resource.

In V2X communication, two transmissions may be performed for each MAC PDU. For example, referring to FIG. 15, when resource for initial transmission is selected, resource for retransmission may be reserved with a predetermined time gap. A UE may determine transmission resources reserved by other UEs and resources used by other UEs through sensing within a sensing window, exclude them within the second window, and then randomly select resource from resources with less interference among the remaining resources.

For example, the UE may decode a PSCCH including information on the period of reserved resources within the sensing window and measure a PSSCH RSRP in resources periodically determined based on the PSCCH. The UE may exclude resources with the PSSCH RSRP value exceeding a threshold from the selection window. Thereafter, the UE may randomly select sidelink resource from among the remaining resources in the selection window.

Alternatively, the UE may measure a received signal strength indication (RSSI) of periodic resources within the sensing window and determine resources with less interference (e.g., resources corresponding to the bottom 20%). In addition, the UE may randomly select sidelink resource from among resources included in the selection window among the periodic resources. For example, when the UE fails to decode the PSCCH, the UE may use the above-described method.

Random Access Procedure (RACH)

When initially accessing a base station or when there is no radio resource for signal transmission, a UE may perform a random access procedure with respect to the base station.

The random access procedure is used for various purposes. For example, the random access procedure may be used for network initial access from RRC_IDLE, an RRC connection re-establishment procedure, handover, UE-triggered UL data transmission, transmission from RRC_INACTIVE, time alignment establishment in addition of SCell, other system information (OSI) request and beam failure recovery, etc. The UE may obtain UL synchronization and UL transmission resource through the random access procedure.

The random access procedure is divided into a contention-based random access procedure and a contention free random access procedure. The contention-based random access procedure is divided into a 4-step random access procedure (4-step RACH) and a 2-step random access procedure (2-step RACH).

Before starting a physical random access procedure, Layer 1 may receive a set of SS/PBCH block indices from a higher layer, and provide a corresponding RSRP measurement set to the higher layer. Before starting the physical random access procedure, Layer 1 may receive the following information from the higher layer.

Configuration of PRACH transmission parameters (PRACH preamble format, time resource and frequency resource for PRACH transmission)

Parameters for root sequence determination and cyclic shift in a PRACH preamble sequence set therefor (index of a logical root sequence table, cyclic shift (NCS) and set type (unrestricted set, restricted set A or restricted set B))

From the viewpoint of the physical layer, an L1 random access procedure may include a random access preamble (Msg1) in a PRACH, a random access response (RAR) message (Msg2) in a PDCCH/PDSCH, and, if applicable, transmission of a Msg3 PUSCH and a PDSCH for contention resolution.

If the random access procedure starts by a PDCCH order to the UE, a random access preamble transmission may have the same subcarrier spacing as the subcarrier spacing of a random access preamble transmission starting by a higher layer.

If a UE is configured with two uplink carriers for a serving cell and the UE detects a PDCCH order, the UE may use a UL/SUL indicator field value from the detected PDCCH order to determine an uplink carrier for corresponding random access preamble transmission. The random access procedure of the UE may be summarized as shown in Table 5 below.

TABLE 5

| | Signal type | Operation/obtained information |
|---|---|---|
| Step 1 | PRACH preamble of uplink | * first beam acquisition * random election of RA-preamble ID |
| Step 2 | Random access response on DL-SCH | timing arrangement information * RA-preamble ID * initial uplink grant, temporary C-RNTI |
| Step 3 | Uplink transmission on UL-SCH | * RRC connection request * UE identifier |
| Step 4 | Contention resolution of downlink | * C-RNTI on PDCCH for initial access * C-RNTI on PDCCH for UE in RRC_CONNECTED state |

Figure 15:
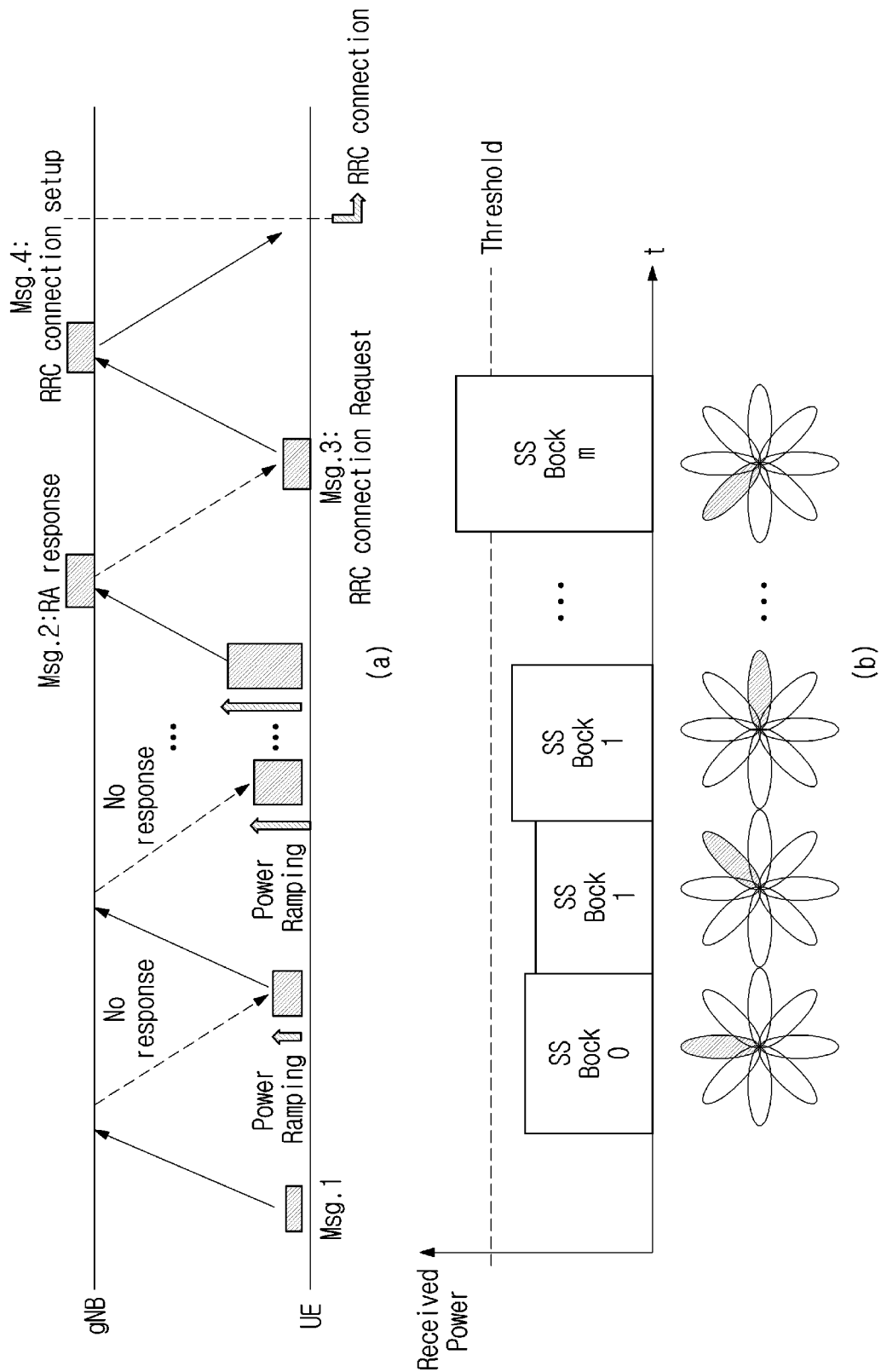
FIG. 15 is a view illustrating a random access procedure, to which the present invention is applicable.

FIG. 15 is a view illustrating a random access procedure, to which the present invention is applicable.

Referring to FIG. 15(a), first, the UE may transmit a PRACH preamble in uplink as Msg 1 of the random access procedure. Random access preamble sequences having two different lengths may be supported. A long sequence having a length of 839 is applicable to subcarrier spacings of 1.25 kHz and 5 kHz and a short sequence having a length of 139 is applicable to subcarrier spacings of 15 kHz, 30 kHz, 60 kHz and 120 kHz. The long sequence may support an inrestricted set and a restricted set of type A and type B, and the short sequence may support only an inrestricted set.

A plurality of RACH preamble formats may be defined by one or more RACH OFDM symbols, different cyclic prefixes and a guard time. A PRACH preamble configuration to be used may be provided to the UE as system information.

If there is no response to Msg1, the UE may retransmit a PRACH preamble power-ramped within a prescribed number of times. The UE may calculate PRACH transmit power for retransmission of a preamble based on the most recent estimation path loss and a power ramping counter. If the UE performs beam switching, the power ramping counter may not be changed.

Referring to FIG. 15(b), the concept of the threshold of an SS block for an RACH resource relationship, to which the present invention is applicable, is illustrated.

A UE may know a relationship between SS blocks and RACH resources through system information. The threshold of the SS block for the RACH resource relationship may be based on RSRP and network configuration. Transmission and retransmission of the RACH preamble may be based on an SS block satisfying the threshold. Accordingly, in the example of FIG. Q7, since an SS block m exceeds the threshold of receive power, the RACH preamble may be transmitted or retransmitted based on the SS block m. Thereafter, when the UE receives a random access response on a DL-SCH, the DL-SCH may provide timing array information, an RA-preamble ID, an initial uplink grant and a temporary C-RNTI. Based on the above information, the UE may perform uplink transmission on a UL-SCH as Msg3 of the random access procedure. Msg3 may include an RRC connection request and a UE identifier. In response thereto, a network may transmit Msg4 which may be treated as a contention resolution message in downlink. By receiving this, the UE may enter an RRC connection state.

Hereinafter, the random access preamble will be described in greater detail.

For a random access preamble transmission step, the physical random access procedure may be triggered by a request for PRACH transmission by a higher layer or a PDCCH order. A configuration by a higher layer for PRACH transmission may include the following.

Configuration for PRACH transmission
  Preamble index, preamble subcarrier spacing, PRACH, target, corresponding RA-RNTI and PRACH resource The preamble may be transmitted using a selected PRACH format having transmit power PRACH, b, f, c(i) on indicated PRACH resource.

A plurality of SS/PBCH blocks related to one PRACH occasion may be provided to the UE by the value of a higher layer parameter SSB-perRACH-occasion. If the value of SSB-perRACH-occasion is less than 1, one SS/PBCH block may be mapped to continuous PRACH occasions of 1/SSB-perRACH-Occasion. A plurality of preambles per SS/PBCH may be provided to the UE by the value of a higher layer parameter cb-preamblePerSSB, and the UE may determine a total number of preambles per SSB per PRACH as a multiple of the value SSB-perRACH-Occasion and the value of cb-preamblePerSSB.

The SS/PBCH block index may be mapped to PRACH occasions in the following order.
  First, ascending order of preamble indices in a single PRACH occasion
  Second, ascending order of frequency resource indices for frequency-multiplexed PRACH occasions
  Third, ascending order of time resource indices for time-multiplexed PRACH occasions in a PRACH slot
  Fourth, ascending order of indices for PRACH slots A period starting from frame 0, which maps SS/PBCH blocks to PRACH occasions, may be a minimum value of a PRACH configuration period $\{1, 2, 4\}$ equal to or greater than $\lceil N_{Tx}^{SSB}/N_{PRACHperiod}^{SSB} \rceil$. Here, the UE may obtain NSSBTx by a higher layer parameter SSB-transmitted-SIB1, and NSSBPRACHperiod may be the number of SS/PBCH blocks mappable to one PRACH configuration period.

If the random access procedure starts by a PDCCH order, if requested by a higher layer, the UE shall transmit a PRACH within a first available PRACH occasion in which a time between a last symbol of PDCCH order reception and a first symbol of PRACH transmission is equal to or greater than NT, 2+ΔBWPSwitching+ΔDelay msec. Here, NT, 2 is a duration of N2 symbols corresponding to a PUSCH preparation time for PUSCH processing capability 1, ΔBWPSwitching is predefined, ΔDelay>0.

Hereinafter, the random access response will be described in greater detail.

In response to PRACH transmission, the UE may attempt to detect a PDCCH having a corresponding RA-RNTI during a window controlled by a higher layer. The window may start at a first symbol of an earliest control resource set configured for the UE for a Type1-PDCCH common search space which is at least $\lceil (\Delta \cdot N_{slot}^{subframe\mu} \cdot N_{symb}^{slot})/T_{sf} \rceil$ symbols after a last symbol of preamble sequence transmission. A length of a window as the number of slots may be provided by a higher layer parameter rar-WindowLength based on a subcarrier spacing for a Type0-PDCCH common search space.

If the UE detects a PDCCH having a corresponding RA-RNTI and a corresponding PDSCH including a DL-SCH transport block within a window, the UE may transmit the transport block to a higher layer. The higher layer may parse the transport block with respect to a random access preamble identity (RAPID) related to PRACH transmission. If the higher layer identifies the RAPID within RAR message(s) of the DL-SCH transmission block, the higher layer may indicate uplink grant to a physical layer. This may be referred to as random access response (RAR) uplink grant at the physical layer. If the higher layer does not identify the RAPID related to PRACH transmission, the higher layer may instruct the physical layer to transmit the PRACH. A minimum time between a last symbol of PDSCH reception and a first symbol of PRACH transmission may be equal to NT, 1+Δnew+0.5. Here, NT, 1 is a duration of N1 symbols corresponding to a PDSCH reception time for PDSCH processing capability when an additional PDSCH DM-RS is configured, and Δnew≥0.

The UE shall receive a PDCCH having a corresponding RA-RNTI and a corresponding PDSCH including a DL-SCH transport block having the same DM-RS antenna port quasi co-location (QCL) feature, for the detected SS/PBCH block or the received CSI-RS. If the UE attempts to detect a PDCCH having a corresponding RA-RNTI as a response to PRACH transmission starting by a PDCCH order, the UE may assume that a PDCCH and a PDCCH order have the same DM-RS antenna port QCL feature.

The RAR uplink grant may schedule PUSCH transmission (Msg3 PUSCH) of the UE. Configuration of the RAR uplink grant starting at MSB and ending at LSB may be given as shown in Table Q3. Table 6 shows the size of a random access response configuration field.

TABLE 6

| RAR grant field | Number of bits |
| --- | --- |
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH) | 3 |
| CSI request | 1 |
| Reserved bits | 3 |

Msg3 PUSCH frequency resource allocation relates to uplink resource allocation type 1. In the case of frequency hopping, based on an indication of a frequency hopping flag field, a first or first two bits (NUL, hop) of the Msg3 PUSCH frequency resource allocation field may be used as hipping information bits of Table Q5.

MCS may be determined by the first 16 indices of an applicable MCS index table for a PUSCH. TPC commands δmsg2,b,f,c are used for power configuration of Msg3 PUSCH, and may be interpreted according to Table 7 below.

TABLE 7

| TPC Command | Value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a non-contention-based random access procedure, a CSI request field may be interpreted to determine whether an aperiodic CSI report is included in corresponding PUSCH transmission. In a contention-based random access procedure, a CSI request field may be reserved.

Unless the UE sets a subcarrier spacing, the UE may receive a subsequent PDSCH using the same subcarrier spacing as PDSCH reception for providing an RAR message.

If the UE does not detect a corresponding PDCCH and a corresponding DL-SCH transport block within a window, the UE may perform a random access response reception failure procedure.

Hereinafter, Msg3 PUSCH transmission will be described in greater detail.

For Msg3 PUSCH transmission, a higher layer parameter msg3-tp may indicate, to the UE, whether the UE applies transform precoding to Msg3 PUSCH transmission. If the UE applies transform precoding to Msg3 PUSCH transmission for frequency hopping, a frequency offset for a second hop may be given as shown in Table 8. Table P5 shows a frequency offset for a second hop for msg3 PUSCH transmission for frequency hopping.

TABLE 8

| Number of PRBs in initial active UL BWP | Value of NUL, hop Hopping Bits | Frequency offset for 2nd hop |
| --- | --- | --- |
| NsizeBWP < 50 | 0 | NsizeBWP/2 |
|  | 1 | NsizeBWP/4 |
| NsizeBWP ≥ 50 | 00 | NsizeBWP/2 |
|  | 01 | NsizeBWP/4 |
|  | 10 | NsizeBWP/4 |
|  | 11 | Reserved |

A subcarrier spacing for Msg3 PUSCH transmission may be provided by a higher layer parameter msg3-scs. The UE shall transmit a PRACH and a Msg3 PUSCH on the same uplink carrier of the same serving cell. Uplink BWP for Msg3 PUSCH transmission may be indicated by SystemInformationBlockType1.

When the PDSCH and the PUSCH have the same subcarrier spacing, the minimum time between the last symbol of PDSCH reception carrying the RAR and the first symbol of corresponding Msg3 PUSCH transmission scheduled by the RAR within the PDSCH for the UE may be equal to $N_{T,1}+N_{T,2}+N_{TA,max}+0.5$ msec. $N_{T,1}$ is a duration of N1 symbols corresponding to a PDSCH reception time for PDSCH processing capability 1 when an additional PDSCH DM-RS is configured, $N_{T,2}$ is a duration of N2 symbols corresponding to a PUSCH preparation time for PUSCH processing capability 1, and $N_{TA,max}$ may be a maximum timing adjustment value which may be provided by a TA command field in the RAR.

Hereinafter, contention resolution will be described in greater detail.

When the UE does not receive a C-RNTI, in response to Msg3 PUSCH transmission, the UE may attempt to detect a PDCCH having a corresponding TC-RNTI scheduling a PDSCH including a UE contention resolution identity. In response to PDSCH reception having the UE contention resolution identity, the UE may transmit HARQ-ACK information in the PUSCH. A minimum time between the last symbol of PDSCH reception and a first symbol of corresponding HARQ-ACK transmission may be equal to $N_{T,1}+0.5$ msec. $N_{T,1}$ may be a duration of N1 symbols corresponding to a PDSCH reception time for PDSCH processing capability 1 when an additional PDSCH DM-RS is configured.

Hereinafter, power saving will be described.

The battery lifespan of the UE is an important aspect of user's experience affecting adoption of 5G handsets and/or services. Since an NR system may support high-speed transmission resource, it is expected that user data increases explosively and tends to be provided in a very short time interval.

Meanwhile, energy efficiency of a device is related to support of two aspects: efficient data transmission when there is a load and low energy consumption when there is no data. Here, efficient data transmission when there is a load may be proved by average spectral efficiency and lower energy consumption when there is no data may be estimated by a sleep ratio.

As power saving technique of a UE, a power saving signal/channel/procedure for triggering UE adaptation for traffic and power consumption features, adaptation according to frequency/time change, adaptation for antennas, adaptation for DRX configuration, adaptation for UE processing capability, adaptation for reduction of PDCCH monitoring/decoding or adaptation for UE power consumption, power consumption reduction at RRM measurement, etc. may be considered.

Here, in relation to adaptation for DRX configuration, a downlink-shared channel (DL-SCH) featuring support for UE DRX enabling UE power saving and a paging channel (PCH) (DRX cycle may be indicated to the UE by the network) featuring support for UE DRX enabling UE power saving may be considered.

In addition, here, in relation to adaptation for UE processing capability, the UE reports static UE radio access capability when the network requests it. A gNB may request which capability of the UE is reported based on band information. If allowed by the network, a temporary capability restraint request may be transmitted by the UE to the gNB to signal restrained availability of some capabilities (e.g., due to hardware sharing, interference or overheating). Thereafter, the gNB may confirm or reject the request. The temporary capability restraint shall be transparent to 5GC. Mainly, only static capabilities are stored in 5GC.

In addition, here, in relation to adaptation for PDCCH monitoring/decoding reduction, the UE monitors a set of PDCCH candidates in a monitoring occasion configured in one or more configured CORESET according to corresponding search space configuration. CORESET is composed of a set of PRBs having a duration of one to three OFDM symbols. Resource unit groups (REGs) and control channel elements (CCEs), which are resource units, are defined in CORESET in which each CCE is composed of a set of one REG. Control channels are formed by aggregation of CCEs. Different code rates for control channels are realized by different aggregation of the number of CCEs. Mapping interleaved and non-interleaved CCE-REGs is supported in CORESET.

In addition, in relation to a power saving signal/channel/procedure for triggering adaptation for UE power consumption, when carrier aggregation (CA) is configured, in order to enable reasonable UE battery consumption, an activation/deactivation mechanism of cells is supported. When a cell is deactivated, the UE does not need to receive a corresponding PDCCH or PDSCH, may not perform corresponding uplink transmission, and does not need to perform CQI measurement. Conversely, when the cell is activated, it is expected that the UE needs to receive a PDCCH and a PDSCH (if the UE is configured to monitor the PDCCH from an SCell) and may perform CQI measurement. NG-RAN ensures that SCells mapped to a PUCCH SCell is deactivated before the PUCCH SCell is changed or removed.

In addition, in relation to power consumption reduction at RRM measurement, if two types of measurement are available, RRM configuration may include beam measurement information (for layer 3 mobility) related to SSB and CSI-RS for reported cell(s).

If carrier aggregation is configured, RRM configuration may include a list of best cells on each frequency in which measurement information is available. In addition, RRM measurement information may include beam measurement for listed cells belonging to a target gNB.

Hereinafter, discontinuous reception (DRX) which is one of techniques capable of realizing UE power saving will be described.

A procedure of a DRX related UE will be summarized as shown in Table 9 below.

TABLE 9

| | Type of signals | UE procedure |
|---|---|---|
| Step 1 | RRC signaling (MAC-CellGroupConfig) | DRX configuration information reception |
| Step 2 | MAC CE(((Long) DRX command MAC CE) | DRX command reception |
| Step 3 | | PDCCH monitoring during on-duration of DRX cycle |

Figure 16:
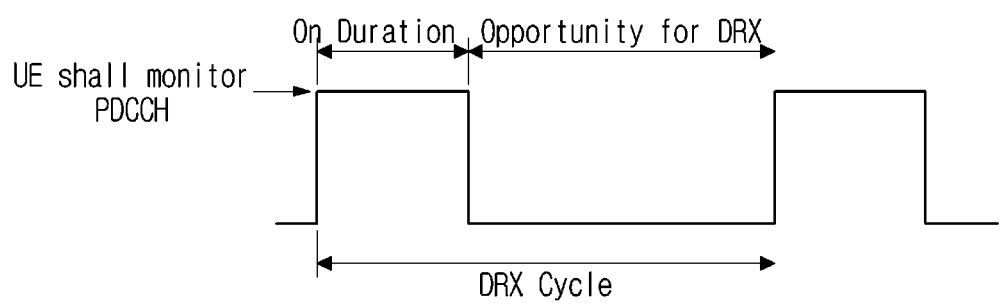
FIG. 16 is a view illustrating an example of a DRX cycle applicable in a communication system.

FIG. 16 is a view illustrating an example of a DRX cycle applicable in a communication system.

Referring to FIG. 16, a UE uses DRX in an RRC_IDLE state and an RRC_INACTIVE state to reduce power consumption. When DRX is configured, the UE performs DRX operation according to DRX configuration information. The UE operating as DRX repeatedly turns on and off reception operation.

For example, when DRX is configured, the UE attempt to perform reception of a PDCCH which is a downlink channel only in a preconfigured time interval and does not attempt to perform reception of the PDCCH in the remaining time interval. The time interval in which the UE attempts to perform PDCCH reception is referred to as on-duration and the on-duration is defined once per DRX cycle.

The UE may receive DRX configuration information from a gNB through RRC signaling and operate as DRX through reception of a (long) DRX command MAC CE.

The DRX configuration information may be included in MAC-CellGroupConfig. MAC-CellGroupConfig which is an IE may be used to configure MAC parameters for a cell group including DRX.

The DRX command MAC CE or the long DRX command MAC CE are identified by a MAC PDU subheader. This has a fixed size of 0 bits.

The following table shows LCD values for a DL-SCH.

TABLE 10

| Index | LCD values |
|---|---|
| 111011 | Long DRX Command |
| 111100 | DRX Command |

PDCCH monitoring operation of the UE is controlled by DRX and bandwidth adaptation (BA). Meanwhile, when DRX is configured, the UE does not need to continuously perform PDCCH monitoring. DRX has the following features.

on-duration: This is a period in which the UE waits to receive a PDCCH after waking up. If the UE successfully decodes the PDCCH, the UE is maintained in an awake state and starts an inactivity-timer.

inactivity timer: This is a time interval in which the UE waits for successful PDCCH decoding from last successful PDCCH decoding and the UE sleeps again in case of failure. The UE shall restart the inactivity timer after single successful PDCCH decoding for only first transmission (That is, not for retransmission).

retransmission timer: This is a time interval in which retransmission is expected.

cycle: This defines periodic repetition of on-duration and a subsequent possible inactivity period.

Hereinafter, DRX in the MAC layer will be described. Hereinafter, a MAC entity may be expressed by a UE or a MAC entity of a UE.

The MAC entity may be configured by RRC having a DRX function for controlling PDCCH monitoring activity of a UE for C-RNTI, CS-RNTI, TPC-PUCCH-RNTI, TPC-PUSCH-RNTI and TPC-SRS-RNTI of the MAC entity. When DRX operation is used, the MAC entity shall monitor a PDCCH. In an RRC_CONNECTED STATE, if DRX is configured, the MAC entity may discontinuously monitor the PDCCH using the DRX operation. Otherwise, the MAC shall continuously monitor the PDCCH.

RRC controls DRX operation by configuring parameters of DRX configuration information.

When the DRX cycle is configured, an activity time includes the following time.

a time when drx-onDurationTimer or drx-InactivityTimer or drx-RetransmissionTimerDL or drx-RetransmissionTimerUL or ra-ContentionResolutionTimer is operating; or a pending time when a scheduling request is transmitted on a PUCCH; or a time when a PDCCH indicating new transmission to a C-RNTI of a MAC entity is not received after successful reception of a random access response to a random access preamble which is not selected by the MAC entity among contention-based random access preambles.

When DRX is configured, the UE shall follow the following procedure.

1> the case where a MAC PDU is transmitted in configured uplink grant

2> drx-HARQ-RTT-TimerUL for a corresponding HARQ process starts immediately after first reception of corresponding PUSCH transmission;

2> drx-RetransmissionTimerUL for a corresponding HARQ procedure is stopped.

1> if drx-HARQ-RTT-TimerDL expires:

2> if data of a corresponding HARQ procedure has not been successfully decoded:

3> drx-RetransmissionTimerDL for a corresponding HARQ procedure starts.

1> if drx-HARQ-RTT-TimerUL expires:

2> drx-RetransmissionTimerUL for a corresponding HARQ procedure starts.

1> if DRX command MAC CE or a long DRX command MAC CE is received:

2> drx-onDurationTimer is stopped;

2> drx-InactivityTimer is stopped.

1> if drx-InactivityTimer expires or the DRX command MAC CE is received:

2> if a short DRX cycle is configured:

3> drx-ShortCycleTimer starts or restarts;

3> a short DRX cycle is used.

2> otherwise:

3> a long DRX cycle is used.

1> if drx-ShortCycleTimer expires:

2> a long DRX cycle is used.

1> if a long DRX command MAC CE is received:

2> drx-ShortCycleTimer is stopped;

2> a long DRX cycle is used.

1> if a short DRX cycle is used and [(SFN*10)+subframe number]modulo(drx-ShortCycle)=(drx-StartOffset)modulo (drx-ShortCycle); or 1> if a long DRX cycle is used and [(SFN*10)+subframe number]modulo(drx-LongCycle)=drx-StartOffset:

2> if drx-SlotOffset is configured:

3> after drx-SlotOffset, drx-onDurationTimer starts.

2> otherwise:

3> drx-onDurationTimer starts.

1> if the MAC entity is in the activity time:

2> a PDCCH is monitored;

2> if the PDCCH indicates DL transmission or if DL allocation is configured:

3> drx-HARQ-RTT-TimerDL for a corresponding HARQ procedure starts immediately after corresponding PUCCH transmission;

3> drx-RetransmissionTimerDL for a corresponding HARQ procedure is stopped.

2> if the PDCCH indicates UL transmission:

3> drx-HARQ-RTT-TimerUL for a corresponding HARQ procedure starts immediately after first reception of corresponding PUSCH transmission;

3> drx-RetransmissionTimerUL for a corresponding HARQ procedure is stopped.

2> if the PDCCH indicates new transmission (UL or DL):

3> drx-InactivityTimer starts or restarts.

1> otherwise (that is, if it is not a portion of the activity time):

2> type-0-triggered SRS is not transmitted.

1> if CQI masking (cqi-Mask) is configured by a higher layer:

2> if drx-onDurationTimer does not operate:

3> a CSI report is not performed on a PUCCH.

1> otherwise:

2> if the MAC entity is not in the activity time:

3> a CSI report is not performed on a PUCCH.

Regardless of whether the MAC monitors the PDCCH or not, the MAC entity transmits HARQ feedback and type-1-triggered SRS when expected.

If it is not a complete PDCCH occasion (that is, the activity time starts or expires in the middle of the PDCCH occasion), the MAC entity does not need to monitor the PDCCH.

Hereinafter, DRX for paging will be described.

The UE may use DRX in the RRC_IDLE state and the RRC_INACTIVE state to reduce power consumption. The UE may monitor one paging occasion P0 per DRX cycle and one P0 may be composed of a plurality of time slots (e.g., subframes or OFDM symbols) in which paging DCI may be transmitted. In multi-beam operation, the length of one P0 is one cycle of beam sweeping, and the UE may assume that the same paging message is repeated in all beams of a sweeping pattern. The paging message is the same in paging initiated by RAN and paging initiated by CN.

One paging frame (PF) is one radio frame and may include one or a plurality of P0s.

When the UE receives RAN paging, an RRC connection resuming procedure starts. If the UE receives paging initiated by CN in the RRC_INACTIVE state, the UE transitions to the RRC_IDLE state and informs an NAS of it.

Figure 17:
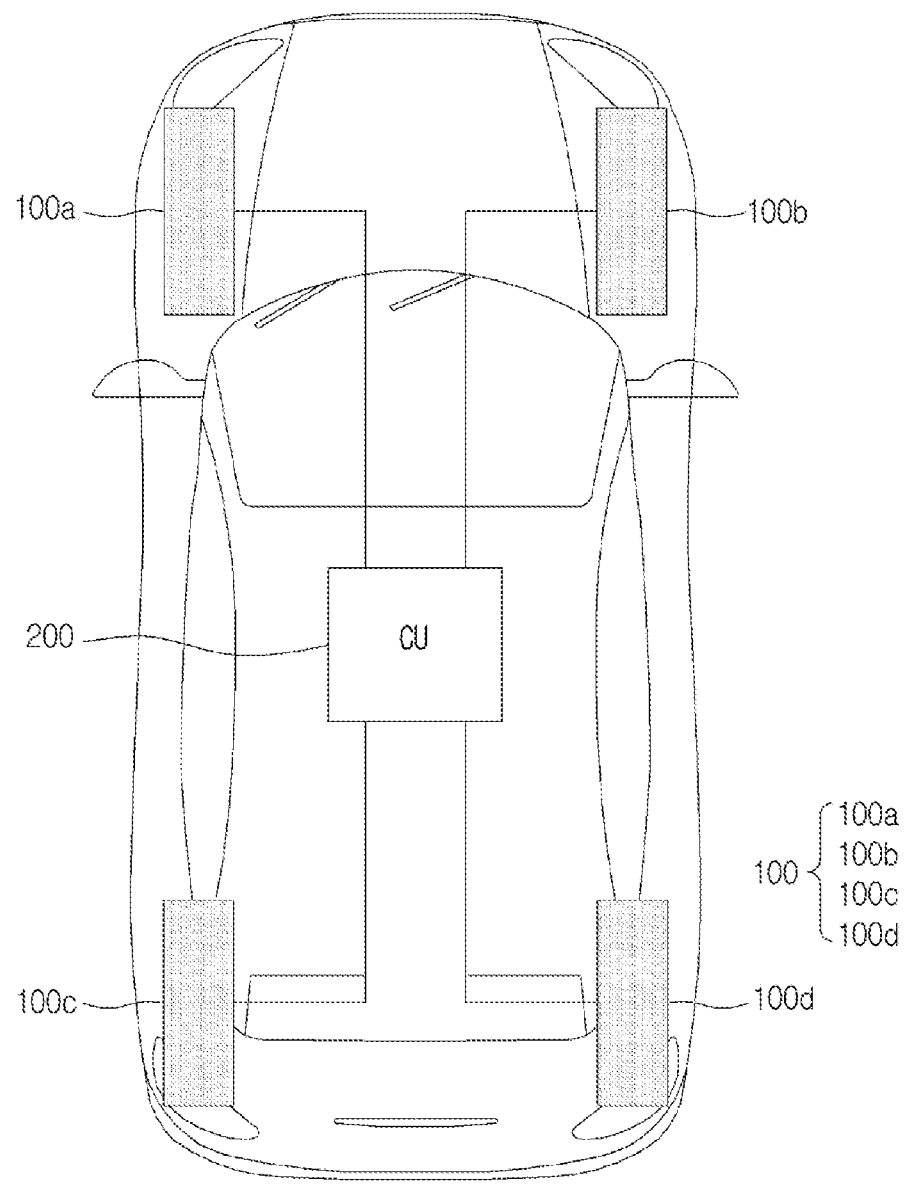
FIG. 17 is a view referenced to describe a communication device provided in a vehicle according to an embodiment of the present invention.

FIG. 17 is a view referenced to describe a communication device provided in a vehicle.

Referring to FIG. 17, the communication device 10 for the vehicle may include a plurality of remote units (Rus) 100 and a central unit (CU) 200.

The plurality of remote units (or a plurality of antenna remote units) 100 may be connected to the central unit 200 by wire. The plurality of remote units 100 may be connected to the central unit 200 wirelessly. The plurality of remote units 100 may access a mobile communication network. The plurality of remote units 100 may transmit signals to the mobile communication network. The plurality of remote units 100 may transmit signals to external devices through the mobile communication network. The external devices may include at least one of a mobile terminal outside a vehicle, a vehicle or a server.

The plurality of remote units 100 may receive signals from the mobile communication network. The plurality of remote units 100 may receive signals from external devices through the mobile communication network. The external devices may include at least one of a mobile terminal outside a vehicle, a vehicle or a server.

Each of the plurality of remote units 100 may include an array antenna. The array antenna may be attached to a vehicle body. The plurality of array antennas may be dispersedly disposed on an upper end of the vehicle body.

For example, the array antennas may be dispersedly attached to a portion of at least one of a hood, a roof, a trunk, a front windshield, a rear windshield or a sidemirror. Alternatively, the array antennas may be attached to a portion of at least one of a hood, a roof, a trunk, a front windshield, a rear windshield or a sidemirror to face the sky. Alternatively, the array antennas may be attached to a portion of at least one of a hood, a roof, a trunk, a front windshield, a rear windshield or a sidemirror to face a direction opposite to the ground.

The array antennas have superior transmit/receive power performance as being located on the top of the vehicle body. Due to the plurality of array antennas included in each of the plurality of remote units 100, it is possible to implement a multiple input multiple output (MIMO) system. When this MIMO system is implemented, communication capacity (e.g., communication data capacity) increases.

The plurality of remote units 100 may include a first remote unit 100a, a second remote unit 100b, a third remote unit 100c and a fourth remote unit 100c.

In some embodiments, the plurality of remote units 100 may include two, three or five or more remote units. Each of the plurality of remote units 100 may receive a reception signal from the same external device through different frequency bands.

For example, the plurality of remote units 100 may include a first remote unit 100a and a second remote unit 100b. The first remote unit 100a may receive a reception signal from a first server through a first frequency band. The second remote unit 100b may receive a reception signal from the first server through a second frequency band.

Meanwhile, each of the plurality of remote units 100 may receive a reception signal from the same external device through different time bands.

For example, the plurality of remote units 100 may include a first remote unit 100a and a second remote unit 100b. The first remote unit 100a may receive a reception signal from a first server through a first time band. The second remote unit 100b may receive a reception signal from the first server through a second time band.

The central unit 200 may perform integrated control with respect to the plurality of remote units 100. The central unit 200 may control each of the plurality of remote units 100. The central unit 200 may be connected to the plurality of remote units 100 by wire. The central unit 200 may be connected to the plurality of remote units 100 wirelessly. The central unit 200 may provide data based on the reception signal received through the plurality of remote units 100 to one or more device located in the vehicle. For example, the central unit 200 may provide data based on a signal received through the plurality of remote units 100 to a mobile terminal carried by one or more passengers.

The device located in the vehicle may be a mobile terminal located in the vehicle and carried by a passenger. The device located in the vehicle may be a user interface device provided in the vehicle. The user interface device is a device for communication between the vehicle and the user. The user interface device may receive user input and provide information generated by the vehicle to the user. The vehicle 100 may implement a user interface (UI) or user experience (UX) through the user interface device.

The user interface device may include a navigation device, an audio video navigation device, a center integrated display (CID), a head up display (HUD) and a cluster.

Implementation of CU and RU

Figure 18:
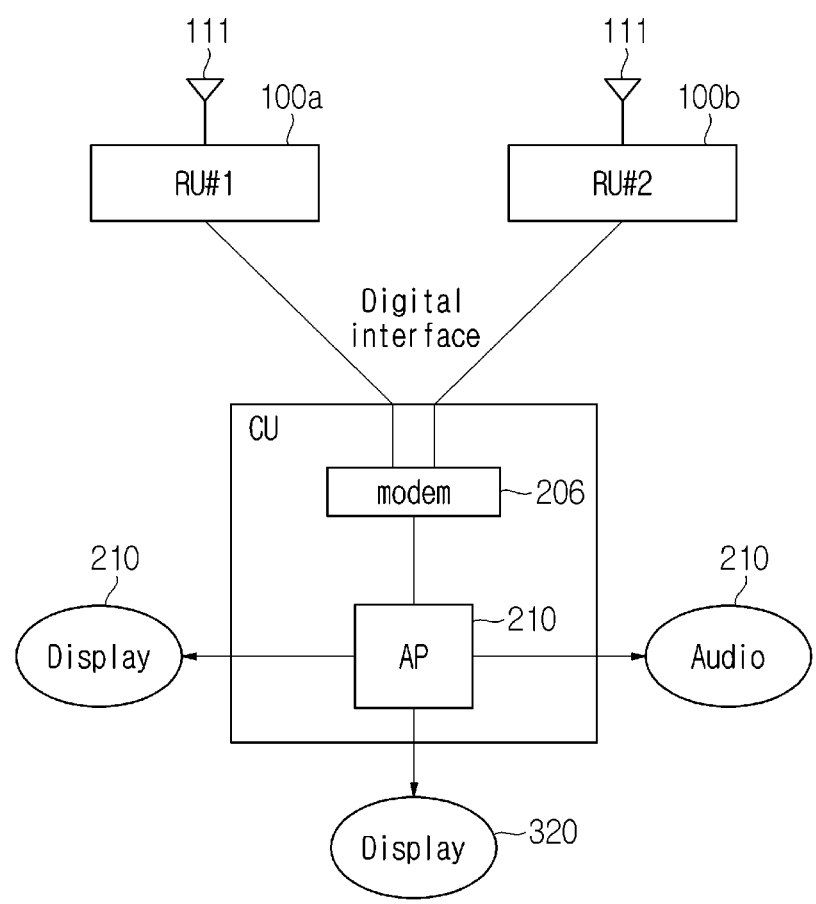
FIG. 18 is a view illustrating a connection relationship and structure between a CU and an RU.

FIG. 18 is a view illustrating a connection relationship and structure between a CU and an RU.

Referring to FIG. 18, each of a plurality of remote units 100a and 100b may include a radio frequency (RF) module, a converter and an AGC controller (or a first processor), and a central unit 200 may include a modem and an AP 210.

Alternatively, each of the remote units 100a and 100b may further include an AFC controller. The central unit 200 may further include an AGC controller and/or an AFC controller or may be implemented by one function of the modem 207. In this case, the central unit 200 may control the AGC controller or/and the AFC controller included in each of the remote units 100a and 100b.

Here, by appropriately distributing and allocating the function/layer module to the remote unit 100 and the central unit 200, it is possible to lower RF implementation difficulty or to obtain implementation gain such as solution of cabling issues between the remote unit 100 and the central unit 200.

The RF module may include an array antenna 111 and an RF circuit in which a communication protocol may be implemented. The array antenna 111 may function as a transmit antenna and a receive antenna. The RF module may include at least one phase locked loop control (PLL) circuit and at least one amplifier. The RF module may further include at least one mixer, at least one filter or a combination thereof. The RF module may be controlled by a second processor or the modem 206 included in the central unit 200.

Each of the remote units 100a and 100b may further include a converter. The converter may convert an analog signal and a digital signal into each other. The converter may include an analog-digital converter (ADC) for converting an analog signal into a digital signal and a digital-analog converter (DAC) for converting a digital signal into an analog signal. As described above, each of the remote units 100a and 100b may include an AGC controller for controlling voltage gain of the converter based on an input voltage and an output voltage.

The central unit 200 may include the modem 206 and the access point 210. Alternatively, the central unit 200 may include a second processor configured separately from the modem 206. The first processor may be referred to as an antenna signal processing processor or a multiple AGC & AFC controller. The second processor may integrally control the plurality of remote units 100a and 100b. The second processor may integrally control the PLL circuit and the amplifier of each of the plurality of remote units 100a and 100b. The processor may perform phase locked loop control (PLL). For example, the second processor may perform PLL through automatic frequency compensation control. The processor may calculate an automatic gain control value. The second processor may calculate an automatic gain control value based on a remote unit having best gain between the plurality of remote units 100a and 100b. The processor may calculate the automatic gain control value based on average receive power of the plurality of remote units 100a and 100b. The second processor may control the amplifier of the RF module based on the automatic gain control value. The second processor may calculate an automatic frequency compensation control value. The processor may control the PLL circuit of the RF module based on the automatic frequency compensation control value. Meanwhile, the second processor may be implemented as some functions of the modem.

The access point (AP) 210 may be connected to the plurality of remote units 100a and 100b and one or more devices 310, 320 and 330 located in the vehicle. The access point 210 may provide data based on the reception signal received through the plurality of remote units 100a and 100b to one or more devices located in the vehicle. Meanwhile, the access point 210 and the modem 206 may exchange signals, information and data through a digital interface.

Meanwhile, in NR, instead of a transceiver for directly converting a baseband signal into a high frequency band while discussing communication using a high frequency band such as mmWave band, a need for a 2-step transceiver for converting a baseband signal into a high frequency band through an intermediate frequency (IF) band is emerging. For example, in communication using mmWave frequency (e.g., 28 GHz), a first transceiver may raise a baseband signal to an intermediate frequency (e.g., 8 to 10 GHz) band and a second transceiver may finally convert the intermediate frequency band (e.g., 8 to 10 GHz) band to the mmWave band (e.g., 28 GHz). That is, as shown in FIG. 12, an IF function block may be added to the RFIC and the modem. In this case, the functions of the RFIC and the IF block may be conversion from the intermediate frequency to the mmWave band (e.g., 8 to 10 GHz) (or from the mmWave band to the intermediate frequency) and conversion from the baseband to the intermediate frequency (e.g., 8 to 10 GHz0 band) (or from the intermediate frequency to the baseband). To this end, in the implemented model, an IF local oscillator and an IF PLL for converting the RF signal to the IF (or converting the IF to the RF signal) need to be further implemented in the RFIC side. This method may be realized in various ways depending on the implementation method.

The necessity of adding the IF band structure is applicable to general communication regardless of whether it is vehicle communication or whether antennas are distributed. That is, as an example of function block distribution between the RU and the CU, various combinations such as {RU:antenna}+{CU:RFIC+IF+Modem+AP}, {RU:antenna, RFIC}+{CU:IF+Modem+AP}, {RU:antenna, RFIC, IF}+{CU:Modem+AP }, {RU:antenna, RFIC+IF+Modem(partial)}+{CU:Modem(partial)+AP} may be considered. However, considering that cabling loss (in case of analog signal transmission between the RU and the CU) due to a distance between the RU and the CU is more severe in a high frequency region, rather than {RU:antenna}+{CU:RFIC+IF+Modem+AP} combination in which the analog signal of the high frequency band is still transmitted through a cable between the RU and the CU, {RU:antenna, RFIC}+{CU:IF+Modem+AP} combination which may consider cabling between the RU and the CU by partially lowering the frequency band to the IF frequency band may be preferred.

Meanwhile, in case of an implementation method in which both AGC and AFC or AFC is controlled in the RU stage, when frequency error is calculated from a signal having poor channel characteristics of the RU, the error may increase. Even if the frequency error measured by each RU is accurate, the output of the oscillator compensated in each RU differs between RUs. In this case, from the viewpoint of the CU, a phenomenon wherein signals transmitted (and/or to be transmitted) from the RUs to the CU are not synchronized occurs. In order to compensate for performance deterioration due to asynchronization between the RU signals, it is necessary to implement a separate function for synchronizing/compensating for the asynchronization signal between the RUs in the CU.

Hereinafter, a method of synchronizing/compensating for an asynchronization signal between RUs in a CU will be described in detail.

Information Exchange Through Interface Between CU and DU

Figure 19:
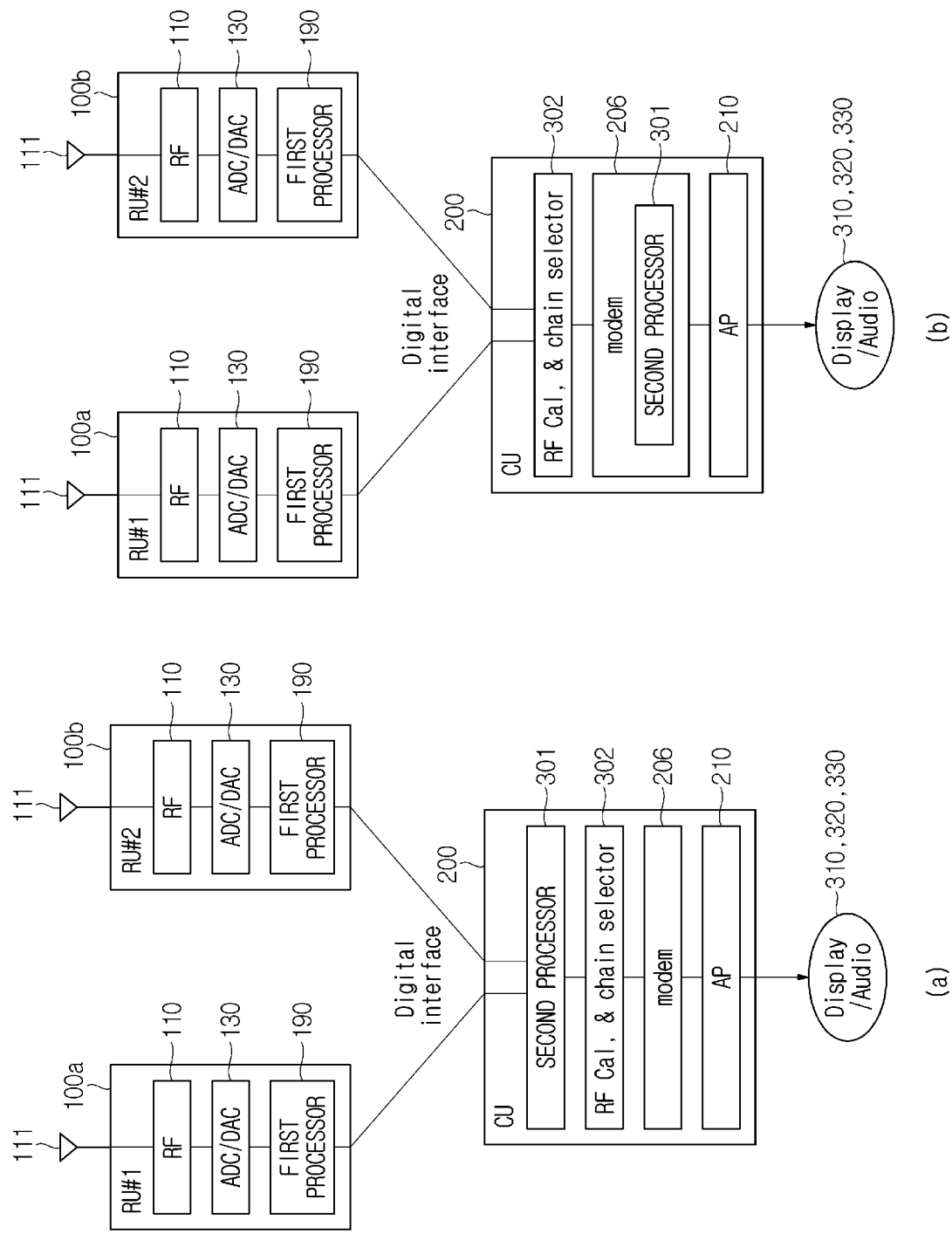
FIG. 19 is a block diagram schematically showing a structure between an RU and a CU.

FIG. 19 is a block diagram schematically showing a structure between an RU and a CU.

Referring to FIG. 19(a), each of RUs 100a and 100b includes a first processor 190, an ADC/DAC 130 and an RF 110, and a CU 200 includes a second processor 301, an RF chain selector 302, a modem 206 and an AP 210. Alternatively, as shown in 19(b), a CU 200 may include an RF chain selector 302, a modem 206 and an AP 210, and the second processor may be included in the modem as a partial function.

The first processor may be an AGC controller and/or an AFC controller, and the second processor may include an AGC controller and/or an AFC controller. Meanwhile, the first processor may not include the AFC controller. In this case, the CU may commonly perform frequency synchronization and/or compensation with respect to all RUs through an AFC control signal. The AFC controller located in the CU may compensate for performance deterioration due to frequency error occurring according to RU distribution implementation, by calculating frequency error based on a best signal-to-noise ratio (SNR) among signals received from the individual RUs.

In this case, in options for implementing vehicle distributed antennas, information exchanged through the interface between the RU and the CU may be used for the purpose of (1) controlling individual RUs through information transmitted from the CU to the RU and/or (2) correcting a value related to processing in the modem and/or performance improvement of the modem located in the CU by transmitting specific parameters, measured values and/or offset values of an individual RU from the RU to the CU.

In relation to (1), the following issues and solutions to solve them may be considered.

As shown in FIG. 19, the second processor (e.g., the unit for calculating the amplifier gain of the RF) which is the AGC controller may not be implemented as a portion of a modem function in the modem, but may be separated from the modem to perform a separate function. Meanwhile, the AGC controller of the modem of the existing CU may apply the common amplifier gain to the RF of all DUs and cannot individually control the AGC value for the RF of each of a plurality of DUs.

The distributed antenna may be different from a co-located antenna as follows in view of implementation.

In the co-located antenna, an AGC controller for calculating the amplifier gain of RF is implemented in a modem as one function, and a value necessary to calculate the amplifier gain or timing for controlling amplifier gain may be controlled by the modem.

In the distributed antenna (or the RU), the AGC controller for calculating the amplifier gain of RF may be configured separately from the modem, and the AGC controller may be the second processor of the CU and the first processor of the DU. Alternatively, in the existing modem, as an additional function, a function for AGC control of the individual DU of the distributed antenna may be implemented. When the AGC controller is included in the RU (or the antenna remote unit or the DU), the modem of the CU needs to maintain the amplifier gain in the DU (or the RU or the antenna remote unit) at a specific value while necessary operation such as channel estimation or data decoding is performed. In other words, when the modem included in the CU performs operation such as channel estimation, the modem needs to prevent the AGC controller or the converter included in the DU (or the RU or the antenna remote unit) from arbitrarily changing amplifier gain.

Alternatively, each of the plurality of RUs may include AGC and/or AFC. The CU may control AGC and/or AFC included in each of the plurality of RUs through the control signal. Specifically, the control signal may be transmitted by the modem included in the CU or may be transmitted by the AGC controller or the AFC controller included in the CU.

Specifically, when channel estimation and/or signal decoding are performed in a receiver implemented in the modem, change in amplifier gain in each DU (or RU) may deteriorate performance of channel estimation and/or data decoding. In other words, change in amplifier gain for each DU (or RU) (or for each group of some/all distributed DUs) within a time interval in which channel estimation and/or data decoding are performed may significantly deteriorate channel estimation and/or data decoding performance in the receiver. Here, the time interval in which channel estimation and/or data decoding are performed may include a processing time for channel estimation or data decoding, a time required for operation of channel estimation and/or data decoding and/or a time for collecting signal samples necessary for operation.

Accordingly, the modem (or the modem of the CU) and/or the AGC controller need to transmit control information for restricting change in amplifier gain during a time necessary to perform channel estimation and/or data (or signal) decoding. Meanwhile, even in the case of the distributed antenna, if the AGC controller is implemented as some functions of the modem, such issues may not be generated.

In this regard, the modem (or the modem of the CU) and/or the AGC controller may transmit the following control information to the DU (or the RU). In other words, the modem of the CU and/or the AGC controller included in the UE may transmit the following control information to the amplifier belonging to an individual RU for the purpose of amplifier gain control for the individual DU (or RU).

The modem (or the modem of the CU) and/or the AGC controller may transmit information on (a) a transmission time unit (e.g., TTI, frame, subframe, slot, symbol duration, etc.) of a transmission/reception signal/channel, (b) a boundary of a transmission (and/or decoding) time unit of a transmission/reception signal channel (e.g., subframe boundary, boundary of FFT/IFFT window) and/or (c) information on a specific time interval necessary to perform channel estimation and/or data decoding in the modem, and/or information on a boundary corresponding to the specific time interval. Alternatively, the modem (or the modem of the CU) and/or the AGC controller may provide information of the purpose of amplifier gain control to the DUs in the form of combination/merging of (a), (b) and (c).

Meanwhile, the information described in (a), (b) and (c) may provide an explicit time interval and/or boundary (e.g., 0.5 msec period after [msec] from a reference time point obtained from a synchronization signal) or implicitly indicate a corresponding specific time interval or boundary through a pre-configured indicator and a mapping table (or a bit map). Here, the mapping table may be preconfigured in the UE or the modem or may be configured by a higher layer signal of the base station.

Here, the modem included in the CU and/or the AGC controller (or the AGC/AFC controller) may be a subject for transmitting the control information. The modem included in the CU and/or the AGC controller may calculate/generate/store information corresponding to (a), (b) and/or (c). Specifically, the second processor 301 or the modem 206 of FIG. 19 may calculate/generate/store the control information. Meanwhile, the control information may be transmitted to the RU (or the DU) and applied to the individual amplifier of the RF of the RU or transmitted to the amplifier in the RU through the first processor in the RU.

Alternatively, the control information may be transmitted from the CU to the DU (or RU) through a wired/wireless/digital/analog interface (e.g., coaxial cable or optical fiber) between the CU and the DU or may be transmitted from the CU to the DU (or RU) through an interface for signaling between function blocks implemented in the modem.

Next, the following problems and a method of solving the problems will be considered in relation to "(2)".

A receiver implemented in the modem may combine a plurality of signals received from a plurality of DUs. In this case, the receiver may combine received signals on the assumption that amplifier gain and/or noise power are the same in the plurality of DUs. For example, in case of maximal ratio combining (MRC), the receiver may calculate a sum of received signal intensity (that is, weighted sum, equal gain combining) on the assumption that amplifier gain and/or noise power (that is, noise power variance, noise power density) of the amplifier of signals received through individual antennas are the same.

However, when amplifier gain of individual RF located in the distributed RU (or DU) differs according to distributed antenna distribution, even if noise power received by the RF of each of the distributed RUs is actually the same, available (or amplified) noise power may differ between the distributed RUs. Accordingly, each of the plurality of RUs needs to transmit information on the amplifier gain thereof (hereinafter referred to as RU gain information) to the modem. In this case, the modem may determine a weight based on information on the amplifier gain received from the RUs and apply the determined weight when performing received signal combining (that is, apply a reference value and/or offset for correcting the noise power value differing between RUs). Therefore, the receiver of the modem can efficiently improve reception performance gain according to received signal combining.

Specifically, RU gain information for the amplifier gain of the individual RU may be provided as an actual value corresponding to the amplifier gain or may be provided as an offset or a difference value based on preconfigured or signaled amplifier gain. Alternatively, each RU may provide the modem with RU gain information for the corresponding amplifier gain as a combination of an indicator for a preconfigured mapping table (or a bit map) or/and a bit.

The RU gain information may be transmitted from the AGC controller to the modem. Specifically, the RU gain information may be transmitted from the second processor (or the AGC controller) of FIG. 19 electrically connected to the ADC/DAC included in each RU to the modem 206. Alternatively, if the first processor 190 shown in FIG. 19 includes an AGC controller, the first processor may transmit the RU gain information to the modem 206, and, if the second processor 301 includes an AGC controller, the second processor may transmit the RU gain information to the modem 206.

Meanwhile, the RU gain information may be transmitted through a wired, wireless, digital or analog interface between the CU and the DU or may be transmitted through a wired, wireless, digital or analog interface between the modem and the processor in the CU (or RU). Alternatively, this may be transmitted through an interface for signaling between function blocks implemented in the modem.

Table 11 defines parameters for a car antenna system related to the above-described invention.

TABLE 11

| Parameter | Car antenna system |
| --- | --- |
| Number of RUs | N |
| Number of antenna ports of RUi | NTX,i |
| Input/Output of AGC | INAGC, { OUTAGC } |
| Output of AFC | OUTAFC |
| Input/output of i-th RU for Data transmission | INRU_D,i, OUTRU_D,i |
| Output of i-th RU for control signaling | OUTRU_C,i |
| Output of modem for control signaling | OUTMD_C |
| Input of gain offset for UL amp. | INUL,AMP |
| Input/output of RU selection processor for Data transmission | INRUS_D,i, OUTRUS_D,i |
| Input of RU selection processor for control signaling | INRUS_C |
| Output of RU virtualization processor for i-th RU | OUTRUV,i |

TABLE 11-continued

| Parameter | Car antenna system |
|---|---|
| Output of RU selection processor for RX | OUTRUS,i_RX |
| Input of RU virtualization processor for TX | OUTRUV,i_TX |
| Input of modem for RX | INMD,i_RX |
| Output of modem for TX | OUTMD,i_TX |
| Power measured at RUi | POUT,i |
| Amplifier total gain offset | ΔG |
| Number of amplifier for i-th RU | Mi |
| Gain control for each amplifier | gi (i = 1,쪌,M) |
| Center frequency offset (AFC control) | Δf |

In this case, the function structure of the individual RU or DU may be defined as follows. Most H/W elements are similar to the antenna/RF in the existing antenna system, but, for configuration of a plurality of RUs in a single modem, AGC for LNA control and AFC for oscillator control are included in each RU. Such an AGC/AFC processor may perform a function for providing an input value for RU selection to the CU.

FIG. 20 is a view illustrating an algorithm performed in an AGC/AFC processor.

Referring to FIG. 20(a), the AGC processor may calculate Mi individual amplifier gains present in RF of an i-th RU based on a value output from the ADC.

The algorithm performed in the AGC/AFC processor will be described. During downlink transmission, the AGC controller in each RU may perform operation based on Rx power measurement. Each RU may determine a gain offset ΔG obtained through amplifiers in RF based on power $P_{OUT}$ of a signal which has passed through the ADC of the individual RU by Equation 1 below.

$$\Delta G = \frac{P_{OUT}}{P_{in}} \quad \text{Equation 1}$$

In this case, $P_{IN}$ is power applied to the UE. The AGC controller may calculate a value of each of Mi individual amplifier gains g1, g2, . . . , gMi present in RF of the i-th RU based on the derived ΔG. The calculated gj (j=1, Mi) may be applied as an input value of each amplifier as a digital value through a serial-to-parallel interface. An amplifier gain offset ΔG value derived in each RU may be transmitted to an RU selection processor present in the CU. Here, the ΔG value calculated in the i-th RU may be defined as ΔGi.

Alternatively, implementation of the AFC controller may be defined as follows. AFC control for the individual RU may be performed based on a phase difference of a reference signal. When the reference signal is transmitted with phases θ1 and θ2 at time points t1 and t2, a center frequency offset Δf calculated by the AFC controller may be calculated by Equation 2 below.

$$\Delta f = \frac{\theta_2 - \theta_1}{t_2 - t_1} \text{(Hz)} \quad \text{Equation 2}$$

The AFC controller may transmit the calculated Δf to the oscillator of the RU as an input value as OUTAFC. The OUTAFC value may be transmitted through a serial-to-parallel interface (SPI) as a digital value and may be used to correct a center frequency value.

Hereinafter, the functional structure of the CU will be described. The OUTRU_D,i port of the i-th RU of the CU may be electrically connected to the INRU_D,i port of an RU selection processor included in the CU, and the OUTRU_C,i port of the CU may transmit a signal to the INRU_C,i port of the RU selection processor included in the CU. In this case, the RU selection processor may transmit a result of RU selection processing to the reception ports of the modem as an input value. The signals of the transmission ports of the modem may be transmitted to all RUs through an RU virtualization processor.

When the total number N of RUs is greater than the number L_RX of reception ports supported by the modem, the RU selection processor performs a function for improving SINR performance by instantaneously adjusting it. Table 12 illustrates an operation procedure of the RU selection processor.

TABLE 12

- If N>L_RX
- Select L_RX RU indexes having L_RX lowest $\Delta G_i$ where $\Delta G_i$ is the input value from the i-th RU through interface $IN_{Rus\_C,i}$
- Denote selected RU indexes: $\{i_1^*, ..., i_{L\_RX}^*\}$
- For l=1, . . . L
- Forward signals from $IN_{Rus\_D\_i_1^*}$ to port $OUT_{RUS\_1}$
- Ignore signals from IN_RU_data_$i_1^*$ for l > $L_{DL}$
- If N=L_RX
- For l=1, . . . L
- Forward signals from $IN_{RUS\_D\_l}$ to port $OUT_{RUS\_1}$ The RU virtualization processor may efficiently transmit signals to all N RUs using L_TX transmission ports supported by the modem. Table 13 illustrates an operation procedure of the RU virtualization processor.

TABLE 13

- Step 1: For given N and L_TX, generate N x L TX matrix X having following property
- $X^H X = I_{L\_TX}$, where $I_N$ denotes N × N identity matrix
- An example of X is DFT matrix
- Step2: Conduct following matrix transformation to generate output signals
- y = Xs
- s is a vector of length L_TX where i-th element correspond to the input signal from port $IN_{Ruv\_j}$(i=1,...,L_TX)
- y is a vector of length N where i-th element correspond to the output signal to port $OUT_{Ruv\_i}$ (i=1,...,N)

Referring to FIG. 20(b), the CU may perform power control with respect to the plurality of RUs.

Specifically, a UE (or a UE included in a vehicle) may obtain uplink power control information based on DCI decoded in the modem of the CU, and calculate a power control command for a transmit power amplifier. The calculated power control command may be transmitted to individual amplifiers through a port OUTMD_C. For example, if the number of RUs is N, the modem of the CU may require N power control. In this case, the modem of the CU may copy the signal applied to OUTMD_C by N and transmit it to all N RUs, and the individual RU may perform power control according to the power control command indicated by the CU based on the amplifier gain gMi with respect to each of Mi amplifiers according to the RF configuration for each RU.

Meanwhile, as described above, the UE may receive information on a plurality of signals received from the plurality of antenna remote units (or the plurality of RUs), and each of the plurality of antenna remote units (or the plurality of RUs) may independently and autonomously change voltage gain through an AGC controller, etc. In addition, since the UE does not individually control the AGC value of each of the plurality of antenna remote units (or the plurality of RUs) through one controller, the voltage gain may be changed in each of the plurality of antenna remote units during decoding or channel estimation. Change in voltage gain may cause deterioration of decoding or channel state estimation performance of the UE. Accordingly, even when the UE does not individually control the AGC value of each of the plurality of antenna remote units, it is necessary to request fixing of voltage gain of each of the plurality of antenna remote units. Hereinafter, a method of transmitting a control signal for requesting fixing of voltage gain of each of the plurality of antenna remote units by the UE or a central unit included in the UE will be described in detail.

Figure 21:
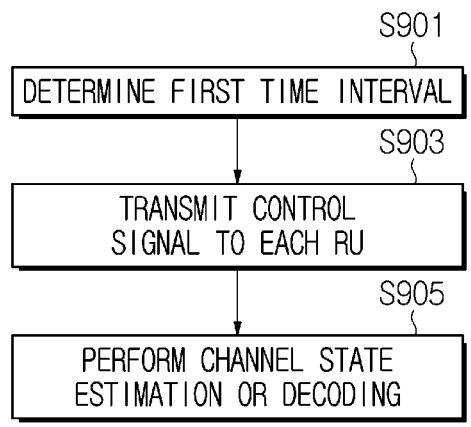
FIG. 21 is a view illustrating a method of controlling a plurality of antenna remote units.

FIG. 21 is a view illustrating a method of controlling a plurality of antenna remote units (or a plurality of RUs).

Referring to FIG. 21, the UE may determine a first time interval which is a specific time interval in consideration of channel estimation capability or decoding capability thereof (S901). The UE may determine or estimate the channel estimation capability based on a time required to collect sampling signals necessary to perform channel state estimation or/and a time required to perform a process related to channel state estimation. Alternatively, the UE may determine or estimate decoding capability in consideration of a time resource region necessary for decoding of data or signals and/or a time required to perform a decoding process of the data or signals.

Alternatively, the UE may determine the first time interval based on a time required to collect sampling signals necessary to perform channel state estimation or/and a time required to perform a process related to channel state estimation. For example, the UE may determine the first time interval to be equal to or greater than the time required to collect sampling signals necessary to perform channel state estimation or/and the time required to perform the process related to channel state estimation.

Alternatively, the UE may determine the first time interval based on a time resource region necessary for data (or signal) decoding and/or a time required to perform the data (or signal) decoding process. For example, the UE may determine the first time interval to be equal to or greater than the time resource region necessary for data (or signal) decoding and/or the time required to perform the data (or signal) decoding process.

Alternatively, the UE may determine the first time interval or/and a first time point based on a time point when a channel state will be reported, when the base station instructs the report of the estimated channel state or if the estimated channel state needs to be periodically reported.

Alternatively, when scheduling information of time resource related to reception of a signal from the base station or another UE is obtained, the UE may determine a first time interval and/or a second time point in consideration of the length of time resource necessary for decoding from the scheduling information and a time required to decode the signal of the time resource length.

The UE may deliver or transmit a control signal to each of the plurality of RUs based on the first interval (S903). The UE may control voltage gain of the plurality of RUs by transmitting the control signal to each of the plurality of RUs. The control signal may include information necessary for control of voltage gain in each of the plurality of RUs.

The control signal may be generated in the UE or the central unit (CU) included in the UE. Alternatively, the control signal may be generated in a modem or AGC controller (or a second processor) included in the central unit (CU), and the AGC controller or the modem may transmit the control signal to the AGC controller (or the first processor) or ADC converter included in each of the plurality of RUs. That is, since each of the plurality of RUs independently includes an ADC controller for controlling the voltage gain of the ADC converter or an RF module, it is possible to autonomously adjust voltage gain without control of the central unit (CU). In other words, each of the plurality of RUs internally and autonomously controls voltage gain (or voltage gain of the amplifiers of the converter) through the AGC controller and, when the control signal is received, may fix autonomous voltage gain (or voltage gain of the amplifiers of the converter) through the AGC controller.

Alternatively, the UE may transmit the control signal to each of the RUs at or before the first interval. The UE may perform control such that the voltage gain of the plurality of RUs (or the plurality of antenna remote units) in the first time interval is not changed. Specifically, the UE may transmit the control signal in order to restrain change in voltage gain of the plurality of RUs or to fix voltage gain from a specific time point determined based on the first time interval. For example, the plurality of RUs may fix voltage gain at a time point when the control signal is received or a specific time point indicated by the control signal based on the control signal. Here, the control signal may indicate fixing of a voltage gain value of each RU at the specific time point without indicating specific voltage gain to be fixed.

Alternatively, the UE may include time information for explicitly specifying the first time interval or time information capable of deriving the first time interval in the control signal. The UE may include information on a time point when voltage gain needs to be fixed based on a reference time point of the synchronization source and/or time information indicating how long fixing is maintained from the above time point in the control signal.

Alternatively, the UE may transmit a control signal including only time size information of the first time interval to each of the plurality of RUs. For example, the UE may indicate fixing of voltage gain by the size information of the first time interval included in the control signal from a time point when the RU receives the control signal.

Alternatively, the UE may specify or determine the first time interval to correspond to a time resource unit (subframe, OFDM symbol or slot) related to transmission and reception of an uplink, sidelink or downlink signal. The UE may specify the first time interval in time resource units for an uplink or downlink signal when determining the first time interval based on the channel estimation capability and/or decoding capability. In this case, the UE may enable the first time interval to correspond to a specific subframe, slot or/and OFDM symbol index. For example, the UE may specify the first time interval from a subframe index A to a subframe index B or from a slot index C of the subframe index A to a slot index D of the subframe index B. In this case, the control signal may include information on time resources allocated to an uplink, sidelink or downlink signal corresponding to the first time interval.

Alternatively, the UE may specify or determine the first time interval to correspond to a boundary of a time resource unit related to transmission of an uplink, sidelink or downlink signal. The UE may specify the first time interval as a boundary of time resource for an uplink, sidelink or downlink signal when determining the first time interval based on channel estimation capability and/or decoding capability. In this case, the control signal may include information time resource related to transmission and reception of an uplink, sidelink or downlink signal corresponding to the first time interval. For example, the control information may include information on the first time interval expressed by a subframe boundary, a slot boundary or an OFDM symbol boundary.

Alternatively, the UE may specify or determine the first time interval to correspond to a sampling boundary of fast Fourier transform (FFT) or inverse FFT (IFFT). Specifically, the UE may specify the first time interval to correspond to a sampling range (e.g., FFT window) and a FFT window boundary when performing decoding of a signal if the first time interval is determined based on channel estimation capability and/or decoding capability. In this case, the control information may include information on a FFT or IFFT window boundary corresponding to the first time interval.

Meanwhile, the UE may determine the time size of the first time interval based on channel capability and/or decoding capability and specify a start time or end time of the first time interval in consideration of the time resource unit related to the transmission and reception of an uplink or downlink signal or the sampling boundary of the FFT or IFFT.

The UE may estimate a channel state or decode the plurality of signals based on a plurality of signals received from the plurality of RUs according to the control signal (S905). In this case, the UE may prevent deterioration of signal (or data) decoding performance and/or channel state estimation performance due to autonomous change in voltage gain in each of the plurality of RUs during the first time interval through the control signal.

The UE may estimate the channel state or decode data by combining a plurality of signals transmitted by the plurality of RUs. Specifically, the UE may combine the plurality of signals according to a maximal ratio combining method. In this case, the UE may combine the plurality of signals on the assumption that the noise powers respectively amplified in the plurality of RUs are the same. However, since the plurality of RUs individually controls voltage gain, different voltage gains may be set and the noise powers respectively amplified in the plurality of RUs may be different from each other. In this case, it is possible to significantly reduce reception gain according to the combination of the plurality of signals. Accordingly, the UE needs to receive noise power from each of the plurality of RUs and to correct noise power of each RU.

Specifically, the UE may receive individual voltage gain information from each of the plurality of RUs and determine a weight to be applied to a signal corresponding to each RU based on the received voltage gain information. The weight may be an offset or a reference value for equalizing the noise powers of the signals respectively received from the plurality of RUs. Here, the gain information may be determined based on an output value of ADC included in each of the plurality of RUs and a voltage applied to the UE.

Alternatively, the UE may transmit the control signal including control information related to transmit power for each of the plurality of RUs based on DCI received from the base station. Specifically, the UE may obtain power information of an uplink signal based on the DCI, and transmit a control signal indicating adjustment of transmit power in each RU based on the power information of the uplink signal.

Since examples of the above-described proposed method may also be included as one of the implementation methods of the present disclosure, it is obvious that they may be regarded as a kind of proposed methods. In addition, the above-described proposed methods may be implemented independently, but may be implemented in the form of a combination (or merge) of some of the proposed methods. The rule can be defined so that the base station informs the UE of information indicating whether the proposed methods are applicable (or information on the rules of the proposed methods) through a predefined signal (e.g., a physical layer signal or a higher layer signal).

Example of communication system, to which the invention applies

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
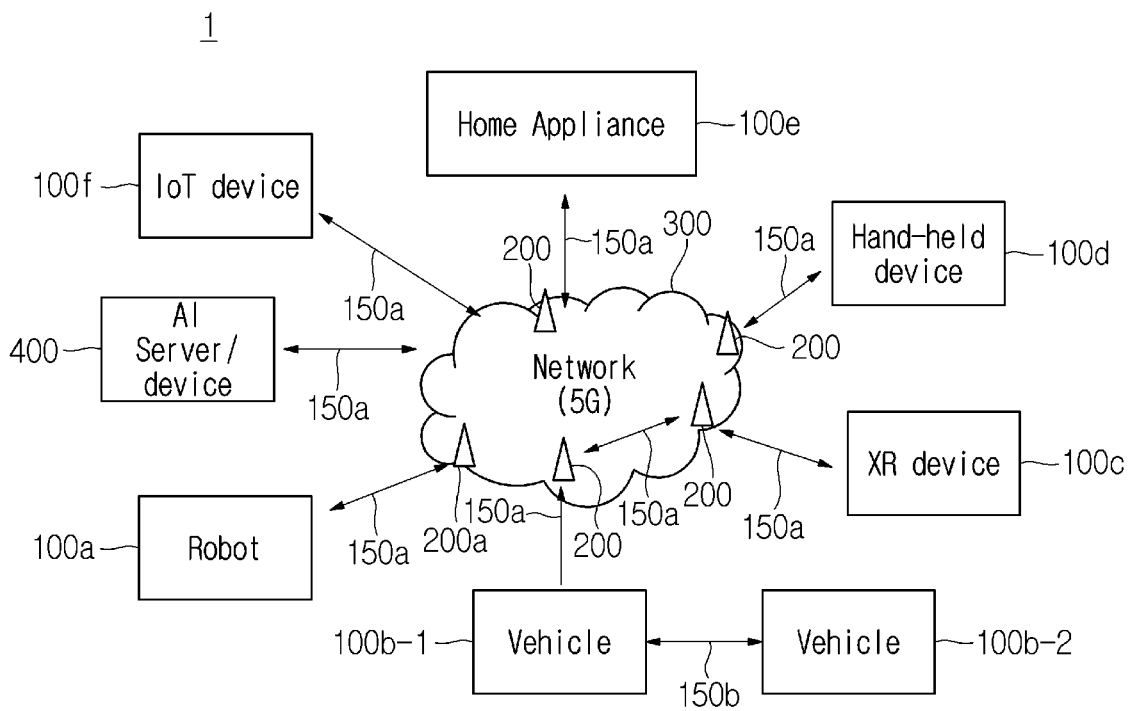
FIG. 22 illustrates a communication system applied to the present invention.

FIG. 22 illustrates a communication system applied to the present invention.

Referring to FIG. 22, a communication system (1) applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An AI technology may be applied to the wireless devices (100a-1000 and the wireless devices (100a-1000 may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Examples of Wireless Device, to Which the Invention Applies

Figure 23:
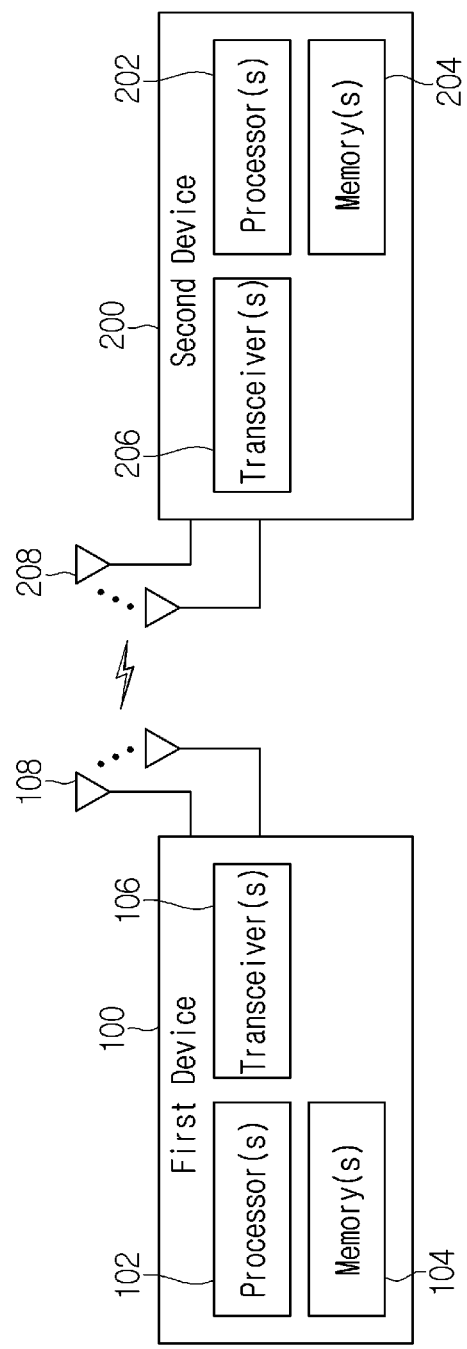
FIG. 23 illustrates wireless devices applicable to the present invention

FIG. 23 illustrates wireless devices applicable to the present invention.

Referring to FIG. 23, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 22.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chipset designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present invention, the wireless device may represent a communication modem/circuit/chipset.

Specifically, the chipset may include at least one processor and memory. The memory may be operatively connected to the at least one processor and configured to enable the at least one processor to perform operation when executed. That is, the memory may include at least one program capable of performing operation related to the embodiments described with reference to FIGS. 16 to 21. The operation may include determining a first time interval based on channel state estimation capability or decoding capability, transmitting a control signal to each of the plurality of antenna remote units based on the first time interval, and performing channel state estimation or signal decoding based on a plurality of signals respectively received by the plurality of antenna remote units. Here, the control signal may include control information indicating fixing of voltage gain of each of the plurality of antenna remote units during the first time interval.

Alternatively, a user equipment (UE) may include a plurality of antenna remote units and a central unit electrically connected to the plurality of antenna remote units. The central unit may be configured to determine a first time interval based on channel state estimation capability or decoding capability, to transmit a control signal to each of the plurality of antenna remote units based on the first time interval, and to perform channel state estimation or signal decoding based on a plurality of signals respectively received by the plurality of antenna remote units. Here, the control signal may include control information indicating fixing of voltage gain of each of the plurality of antenna remote units during the first time interval.

Alternatively, a computer-readable storage medium including at least one computer program for enabling at least one processor to perform operation may be provided. The operation may include determining a first time interval based on channel state estimation capability or decoding capability, transmitting a control signal to each of the plurality of antenna remote units based on the first time interval, and performing channel state estimation or signal decoding based on a plurality of signals respectively received by the plurality of antenna remote units. Here, the control signal may include control information indicating fixing of voltage gain of each of the plurality of antenna remote units during the first time interval.

In addition, the UE, the chipset or the computer program may perform channel state estimation and/or data decoding based on a plurality of signals received from the plurality of antenna remote units using the control signal including on the information on the first time interval in a manner described above with respect to FIGS. 16 to 21.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/ signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present invention, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Example of Utilizing Wireless Device, to Which the Present Invention Applies

FIG. 24 illustrates another example of a wireless device applied to the present invention. The wireless device may be implemented in various forms according to a use-case/service (refer to FIG. 22).

Referring to FIG. 24, wireless devices (100, 200) may correspond to the wireless devices (100, 200) of FIG. 24 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 24. For example, the transceiver(s) (114) may include the one or more transceivers (106, 206) and/or the one or more antennas (108, 208) of FIG. 24. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 29, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 29 will be described in detail with reference to the drawings.

Example of Portable Device, to Which the Present Invention Applies

Figure 25:
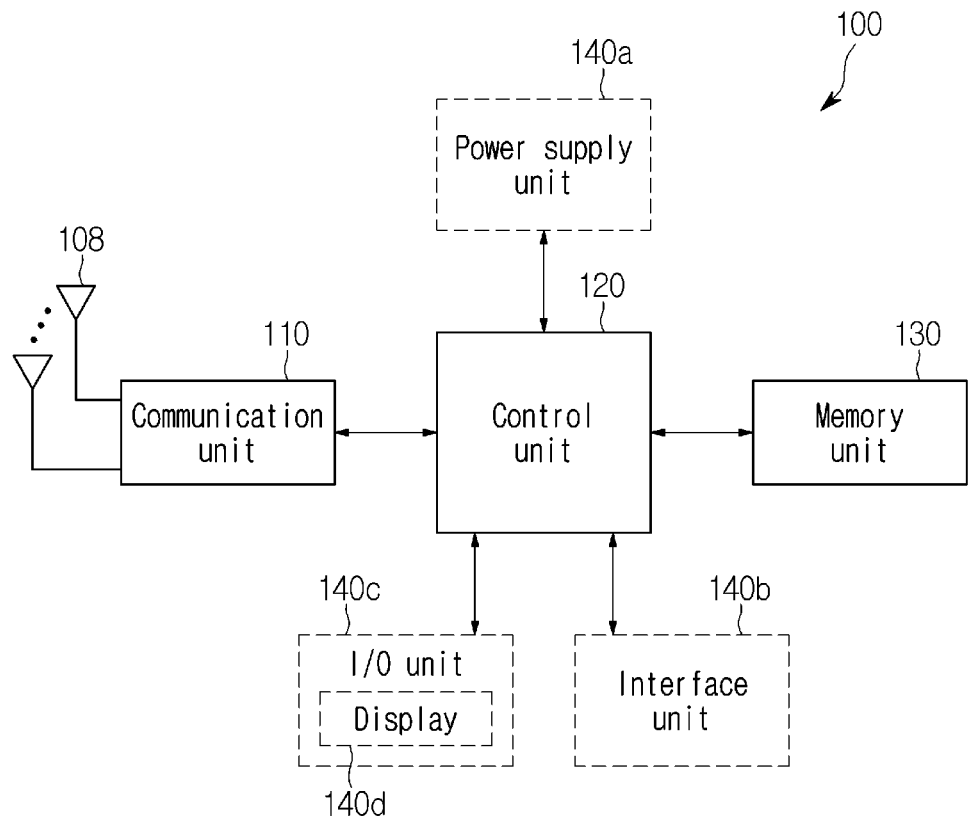
FIG. 25 illustrates a hand-held device applied to the present invention.

FIG. 25 illustrates a hand-held device applied to the present invention. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 24, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 26:
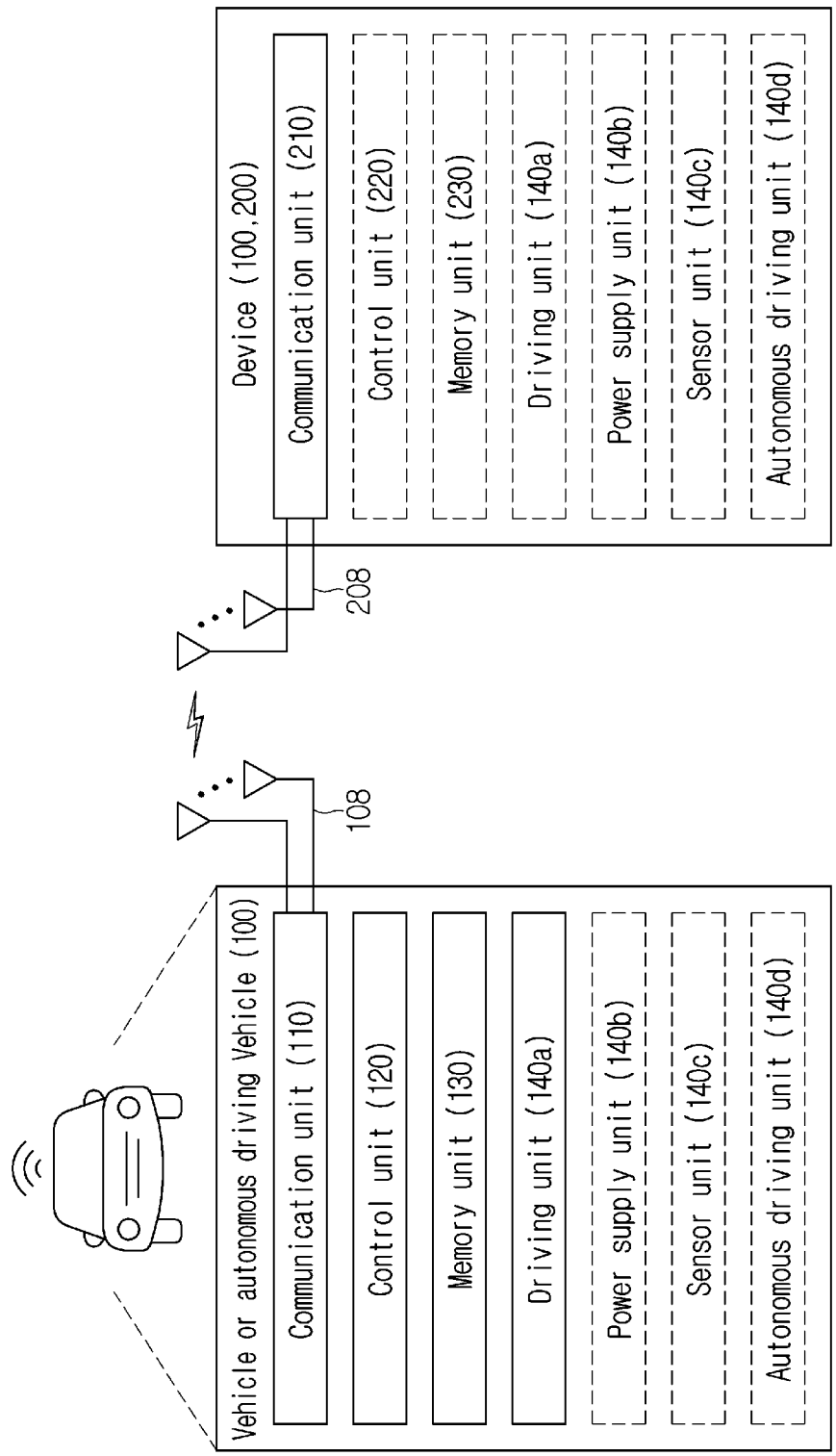
FIG. 26 illustrates a vehicle or an autonomous vehicle applied to the present invention.

Example of Vehicle or Autonomous Vehicle, to Which the Present Invention Applies FIG. 26 illustrates a vehicle or an autonomous vehicle applied to the present invention. The vehicle or autonomous vehicle may be implemented by a mobile robot, a car, a train, a manned/unmanned Aerial Vehicle (AV), a ship, etc.

Referring to FIG. 26, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 29, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, etc. The power supply unit (140b) may supply power to the vehicle or the autonomous vehicle (100) and include a wired/wireless charging circuit, a battery, etc. The sensor unit (140c) may obtain a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In this disclosure, the above-mentioned embodiments of the present invention are disclosed on the basis of a signal transmission/reception relationship between a UE and a base station. Such a transmission/reception relationship equally/similarly extends to signal transmission/reception between a UE and a relay or a base station and a relay. In this disclosure, specific operation performed by the base station may be performed by an upper node in some cases. That is, it will be obvious that various operations performed for communication with the UE in a network composed of a plurality of network nodes including a base station may be performed by the base station or network nodes other than the base station. The term "Base Station" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The following embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention are applicable to various mobile communication systems.

What is claimed is:

1. A method for controlling a plurality of antenna remote units by a user equipment (UE) in a wireless communication system supporting sidelink communications, the method comprising:
obtaining synchronization by using at least one primary sidelink synchronization signal (PSSS) and at least one secondary sidelink synchronization signal (SSSS);
receiving system information through physical sidelink broadcast channel (PSBCH);

receiving control information through physical sidelink control channel (PSCCH);
estimating a channel by using demodulation reference signal (DMRS) received through physical sidelink shared channel (PSSCH) based on the control information; and
receiving sidelink data through the (PSSCH) based on the control information;
wherein the estimating the channel comprises,
determining a first time interval for channel estimation based on channel state estimation capability of a central unit;
transmitting a control signal to a first antenna remote unit and a second antenna remote unit based on the first time interval, the first antenna remote unit including a first antenna array and a first automatic gain controller and the second antenna remote unit including a second antenna array and a second automatic gain controller; and
performing the channel estimation based on signals received during the first time interval through the first antenna remote unit and the second antenna remote unit,
wherein the control signal comprises control information indicating fixing of voltage gain of each of the first antenna remote unit and the second antenna remote unit during the first time interval, and
wherein the sidelink communications are performed based on at least one protocol stack including at least one of a physical layer, a media access control layer, a radio link control layer or a packet data conversion layer,
wherein the first time interval is determined based on a sampling time for signals necessary for the channel estimation and a processing time for the channel estimation.

2. The method of claim 1, wherein the control information further comprises information on an orthogonal frequency division multiplexing (OFDM) symbol or slot corresponding to the first time interval.

3. The method of claim 1, wherein the control information further comprises information on a subframe or slot boundary corresponding to the first time interval.

4. The method of claim 1, wherein the control information further comprises information related to a sampling boundary of a fast Fourier transform (FFT) or inverse FFT (IFFT) corresponding to the first time interval.

5. The method of claim 1, wherein the control signal restrains the first automatic gain controller and the second automatic gain controller from changing voltage gain.

6. The method of claim 1, further comprising:
receiving gain information from each of the first antenna remote units and the second antenna remote units.

7. The method of claim 6, further comprising:
determining a weight for each of the first antenna remote units and the second antenna remote units based on the gain information; and
performing a combination of the plurality of signals based on the determined weight.

8. The method of claim 7, wherein the combination of the plurality of signals is performed according to a maximal ratio combining (MRC) scheme.

9. The method of claim 7, wherein the weight is a value for correcting a difference in noise power related to each antenna remote unit.

10. The method of claim 1, wherein the gain information is determined based on an output value of an analog-to-digital converter (ADC) in each of the first antenna remote units and the second antenna remote units and a voltage applied to the UE.

11. The method of claim 1, wherein the control information further comprises power information determined based on uplink power control information according to downlink control information (DCI) received from a base station.

12. A chipset for controlling a plurality of antenna remote units in a wireless communication system supporting sidelink communications, the chipset comprising:
at least one processor; and
at least one memory operatively connected to the at least one processor and configured to enable the at least one processor to perform operation when executed,
wherein the operation comprises:
obtaining synchronization by using at least one primary sidelink synchronization signal (PSSS) and at least one secondary sidelink synchronization signal (SSSS);
receiving system information through physical sidelink broadcast channel (PSBCH);
receiving control information through physical sidelink control channel (PSCCH);
estimating a channel by using demodulation reference signal (DMRS) received through physical sidelink shared channel (PSSCH) based on the control information; and
receiving sidelink data through the (PSSCH) based on the control information; wherein the estimating the channel comprises,
determining a first time interval for channel estimation based on channelstate estimation capability of a central unit;
transmitting a control signal to a first antenna remote unit and a second antenna remote unit based on the first time interval, the first antenna remote unit including a first antenna array and a first automatic gain controller and the second antenna remote unit including a second antenna array and a second automatic gain controller; and
performing the channel estimation based on signals received during the first time interval through the first antenna remote unit and the second antenna remote unit,
wherein the control signal comprises control information indicating fixing of voltage gain of each of the first antenna remote unit and the second antenna remote unit during the first time interval, and
wherein the sidelink communications are performed based on at least one protocol stack including at least one of a physical layer, a media access control layer, a radio link control layer or a packet data conversion layer,
wherein the first time interval is determined based on a sampling time for signals necessary for the channel estimation and a processing time for the channel estimation.

13. A user equipment (UE) for controlling a plurality of antenna remote units in a wireless communication system supporting sidelink communications, the UE comprising:
the plurality of antenna remote units; and
a central unit electrically connected to the plurality of antenna remote units, wherein the central unit is configured to:
obtain synchronization by using at least one primary sidelink synchronization signal (PSSS) and at least one secondary sidelink synchronization signal (SSSS);

receive system information through physical sidelink broadcast channel (PSBCH); receive control information through physical sidelink control channel (PSCCH);

estimate a channel by using demodulation reference signal (DMRS) received through physical sidelink shared channel (PSSCH) based on the control information; and receive sidelink data through the (PSSCH) based on the control information; wherein the central unit is further configured to:

determine a first time interval for channel estimation based on channel state estimation capability of the central unit;

transmit a control signal to a first antenna remote unit and a second antenna remote unit based on the first time interval, the first antenna remote unit including a first antenna array and a first automatic gain controller and the second antenna remote unit including a second antenna array and a second automatic gain controller; and perform the channel estimation based on signals received during the first time interval through the first antenna remote unit and the second antenna remote unit, wherein the control signal comprises control information indicating fixing of voltage gain of each of the first antenna remote unit and the second antenna remote unit during the first time interval, and wherein the sidelink communications are performed based on at least one protocol stack including at least one of a physical layer, a media access control layer, a radio link control layer or a packet data conversion layer, wherein the first time interval is determined based on a sampling time for signals necessary for the channel estimation and a processing time for the channel estimation.

14. The chipset of claim 12, wherein the central unit adjusts a driving mode of a device connected to the chipset based on a predetermined time.

* * * * *